(12) United States Patent  (10) Patent No.: US 8,700,863 B2
Ukai  (45) Date of Patent: Apr. 15, 2014

(54) COMPUTER SYSTEM HAVING A CACHE MEMORY AND CONTROL METHOD OF THE SAME

(75) Inventor: Megumi Ukai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/223,984

(22) Filed: Sep. 1, 2011

(65) Prior Publication Data

US 2012/0005439 A1  Jan. 5, 2012

Related U.S. Application Data

(63) Continuation of application No. PCT/JP2009/001020, filed on Mar. 6, 2009.

(51) Int. Cl.
*G06F 12/08* (2006.01)
(52) U.S. Cl.
CPC ........ *G06F 12/0822* (2013.01); *G06F 12/0815* (2013.01); *G06F 12/082* (2013.01)
USPC ............................ 711/144; 711/146; 711/158
(58) Field of Classification Search
USPC .......................................... 711/144, 146, 158
See application file for complete search history.

(56) References Cited

U.S. PATENT DOCUMENTS

| | | | |
|---|---|---|---|
| 5,809,536 A | | 9/1998 | Young et al. |
| 5,832,534 A | * | 11/1998 | Singh et al. ................... 711/141 |
| 5,903,908 A | * | 5/1999 | Singh et al. ................... 711/122 |
| 6,055,610 A | * | 4/2000 | Smith et al. ................... 711/156 |
| 6,868,485 B1 | | 3/2005 | Conway |
| 6,981,106 B1 | * | 12/2005 | Bauman et al. ............... 711/146 |
| 2003/0079086 A1 | | 4/2003 | Shanahan et al. |

FOREIGN PATENT DOCUMENTS

| | | |
|---|---|---|
| CN | 1685319 | 10/2005 |
| DE | 697 36 544 T2 | 8/2007 |
| EP | 0 847 011 A2 | 6/1998 |
| EP | 1 304 621 A2 | 4/2003 |
| JP | 10-260898 | 9/1998 |
| JP | 11-154115 | 6/1999 |
| JP | 2003-186742 | 7/2003 |
| JP | 2006-501546 | 1/2006 |
| KR | 1020050070012 | 7/2005 |
| WO | 2004/029776 A2 | 4/2004 |

OTHER PUBLICATIONS

International Search Report for PCT/JP2009/001020, mailed Jul. 21, 2009.

(Continued)

*Primary Examiner* — Than Nguyen
(74) *Attorney, Agent, or Firm* — Staas & Halsey LLP

(57) ABSTRACT

A computer includes a memory that stores data, a cache memory that stores a copy of the data, a directory storage unit that stores directory information related to the data and includes information indicating that the data is copied to the cache memory, a directory cache storage unit that stores a copy of the directory information stored in the directory storage unit, and a control unit that controls storage of data in the directory cache storage unit, manages the data copied from the memory to the cache memory by dividing the data into an exclusive form and a shared form, and sets a priority of storage of the directory information related to the data fetched in the exclusive form in the directory cache storage unit higher than a priority of storage of the directory information related to the data fetched in the shared form in the directory cache storage unit.

9 Claims, 18 Drawing Sheets

(56) References Cited

OTHER PUBLICATIONS

Bibliographic information for Australian Patent Application 2003272795 A1 published Apr. 19, 2004.
Manuel E. Acacio et al., "Reducing the Latency of L2 Misses in Shared-Memory Multiprocessors through On-Chip Directory Integration", Proceedings of the 10$^{th}$ Euromicro Workshop on Parallel, Distributed and Network-based Processing (EUROMICRO-PDP'02), Jan. 2002, pp. 368-375.
Office Action mailed Apr. 16, 2013 in corresponding Japanese Patent Application No. 2011-502506.
Office Action mailed Jul. 16, 2013 in corresponding Japanese Application No. 2011-502506.

* cited by examiner

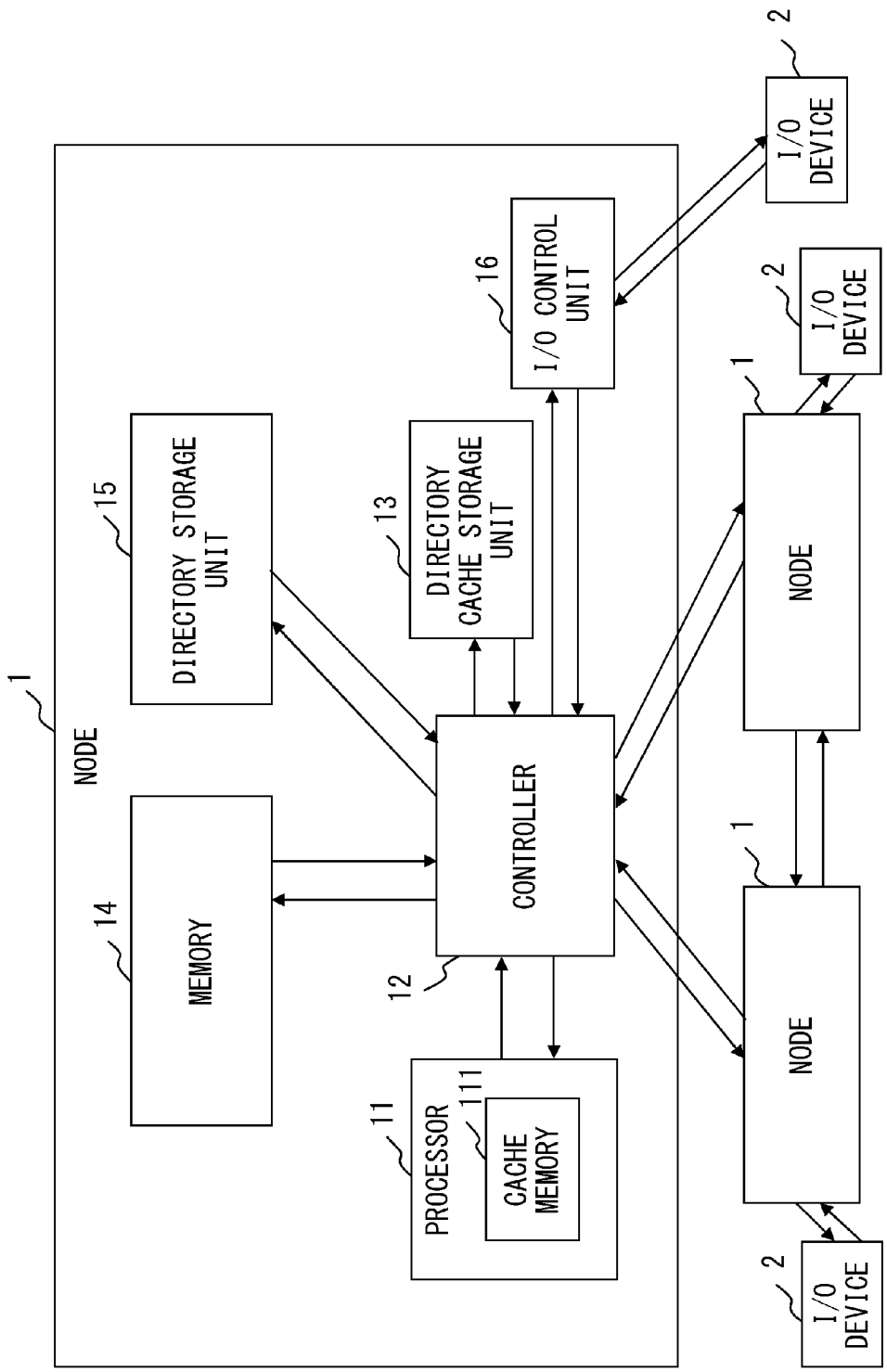
F I G. 1

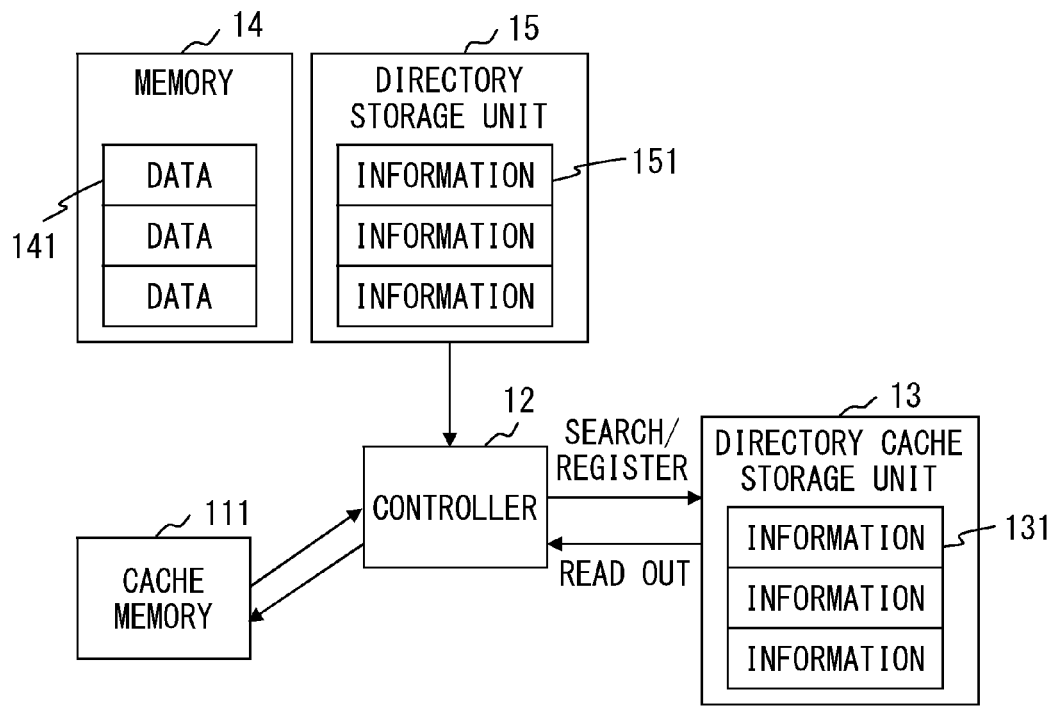
F I G. 2

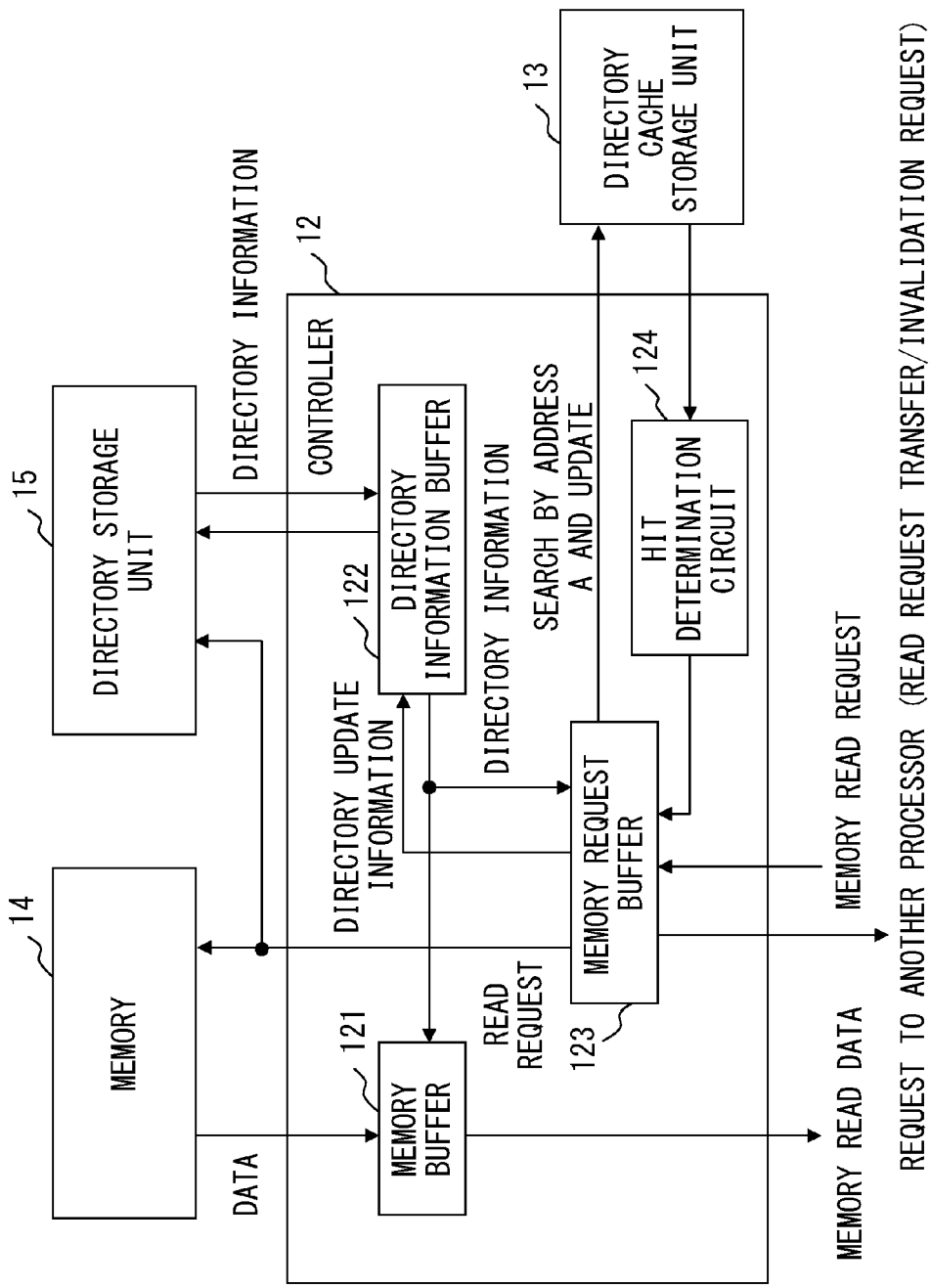
F I G. 4

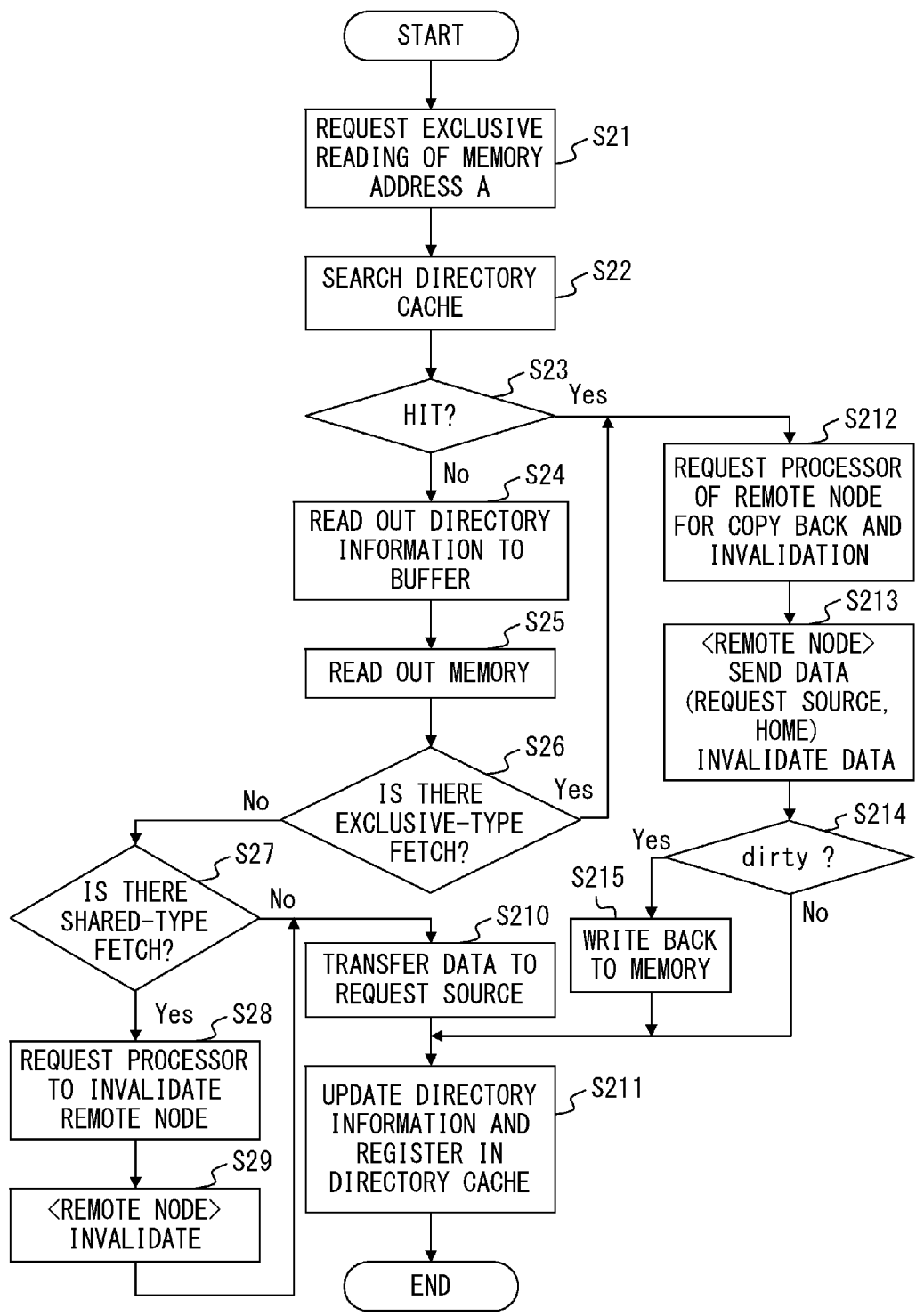
F I G. 1 1

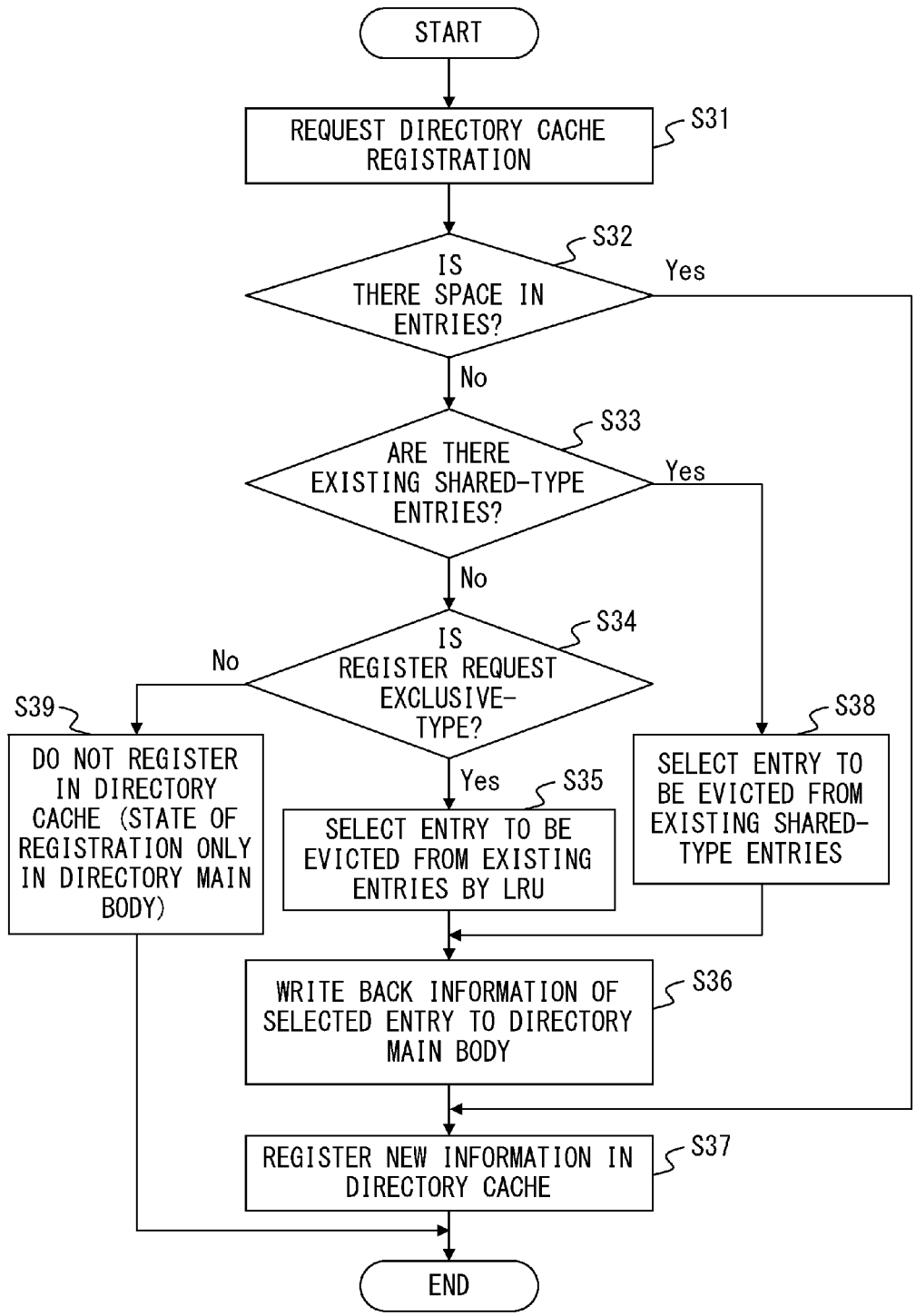
F I G. 1 2

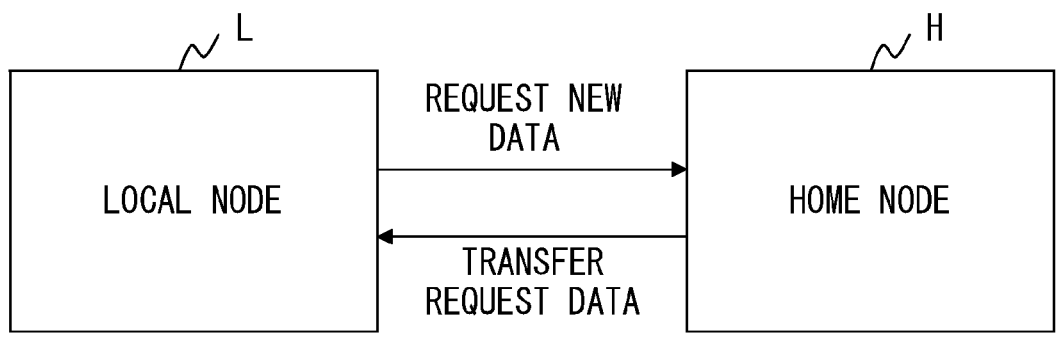
F I G. 16

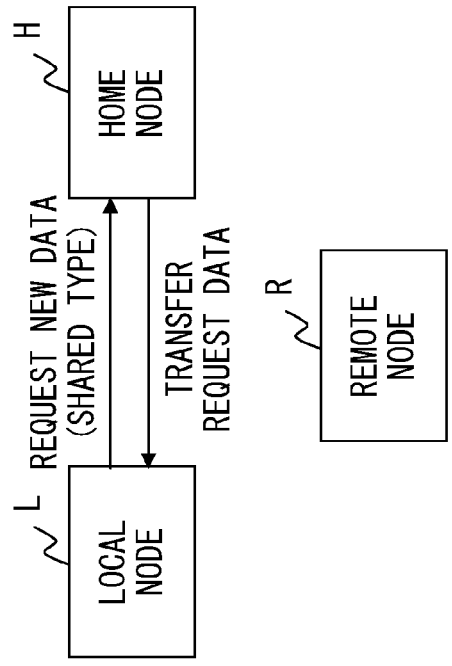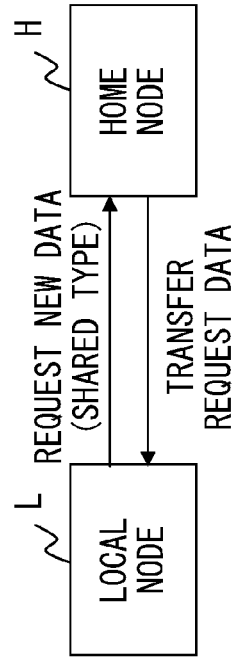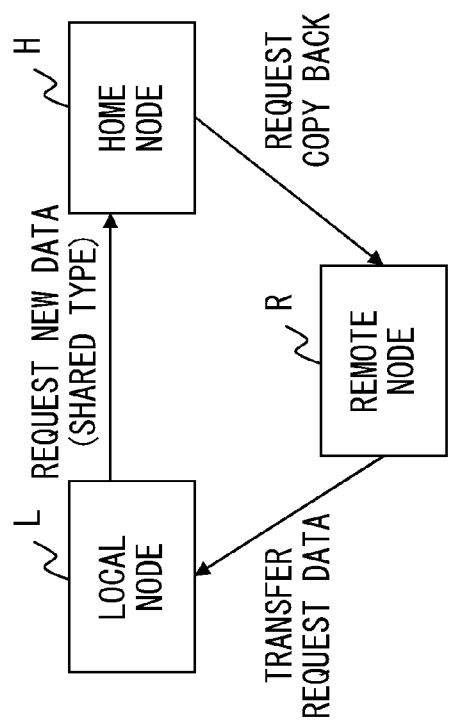

COMPUTER SYSTEM HAVING A CACHE MEMORY AND CONTROL METHOD OF THE SAME

CROSS-REFERENCE TO RELATED APPLICATIONS

This application is a continuation application of International Application PCT/JP2009/001020 filed on Mar. 6, 2009 and designated the U.S., the entire contents of which are incorporated herein by reference.

FIELD

The present invention relates to a computer system, a control method, a recording medium, and a control program.

BACKGROUND

A plurality of processors share a memory in a shared-memory multi-processor system. Therefore, copies of the same data block in the memory may exist at the same time in a plurality of cache memories. Thus, state information indicating the states of data blocks needs to be managed to execute data processing while maintaining the cache coherency.

Main examples of the states of the data blocks include shared (S; Shared), exclusive updated (clean) (E; Exclusive Clean), exclusive not updated (dirty) (M; Modified), and invalid (I; Invalid). The cache protocol including such the four states, i.e., M, E, S, and I is referred to as MESI. Hereinafter, the shared will be expressed as "S" or "Shared", the exclusive not updated will be expressed as "E" or "Exclusive", the exclusive updated will be expressed as "M" or "Modified", and the invalid will be expressed as "I" or "Invalid".

The state S is a state in which the data block to be processed is a read-only data block, and the referencing processor does not have a right to update the data block to be processed. The same data block as the data block to be processed may exist in another cache memory.

The state E is a state in which the same data block as the data block to be processed does not exist in other cache memories, and the referencing processor has a right to update the data block to be processed. The data block to be processed is not updated, and the data block coincides with the data block to be processed in the memory.

The state M is a state in which the same data block as the data block to be processed does not exist in other cache memories, and the referencing processor has a right to update the data block to be processed. The data block to be processed has been updated, and the content of the data block is different from that of the data block to be processed in the memory. Therefore, the data block to be processed is the only latest information.

The state I is a state in which the data block to be processed is valid and is not in the cache memory.

The state information of the data blocks in the cache memory is usually registered in cache tags with entries corresponding to the lines of the cache memory.

For example, it is assumed that a data block to be loaded exists in a cache memory in the state S when a load command is executed in a processor. In this case, the processor can use the data block as it is. However, even if the processor tries to execute a store command, the store command cannot be processed because of the state S, i.e. a state without the right to update the data block. Therefore, the state of the data block needs to be change into the state E or the state M, i.e. a state with an exclusive right. For example, when the state of the data block is in the state S, the processor transmits, to one or a plurality of other cache memories that hold the data block to be processed, a request for invalidating the data block to be processed in the other processors, and the processor itself makes a transition to an exclusive type.

When the processor executes a load command or a store command, it may be happen the processor does not have any data block to be loaded, etc. In this case, the processor needs to acquire the data block to be processed. However, the data block in the memory may not be the latest. More specifically, there is a possibility that one of the cache memories has the data block to be processed in the state M. In this case, the processor needs to search the data block in the state M to maintain the cache coherency.

As described, to perform the coherent control of the cache memory efficiently, it is important to recognize in which cache memory and in which state the data block to be processed exists. For this purpose, a snoop-based method and a directory-based method are known.

In the directory-based method, one of the nodes performs central management of the state information of one data block. The nodes are units including processors, memories, and controllers of the processors and the memories. The nodes further include directory storage units which hold directory information, i.e. information indicating to which cache memories and in which states the data blocks of the memories belonging to the nodes are fetched.

It is assumed that a processor has issued a request for a data block. A node to which the processor of the request source belongs will be called as a "local node". A node to which a memory that includes the data block to be processed belongs will be called as a "home node". In other words, the home node is a node including the directory storage unit that manages the data block to be processed. When a response is generated from another cache memory as a result of the request, the node to which the cache memory belongs will be called as a "remote node".

The directory storage unit has information related to all data blocks fetched to the cache memory. The directory storage unit stores information, such as which cache memory fetches (or copies) a block data and whether there is a possibility that the data block is rewritten. The possibility of rewriting denotes that the data block has been already rewritten or will be rewritten.

In the directory-based method, the processor that has requested for the data block recognizes, from the directory storage unit of the home node that manages the data block, in which cache memory and in which state the requested data block exists. The home node that has received the request of data acquires the directory information from the directory storage unit and executes necessary processing. If the entries of the directory storage unit correspond one-to-one with the data blocks, the directory storage unit is often arranged on the memory. Whether the entries of the directory storage unit correspond to all data blocks in the memory depends on the implementation.

In the directory-based method, the performance of the processor can be improved by tuning the software to allocate the data of the memory as close to the processor that uses the data as possible. If data requested by a processor exists in the memory of the node of the processor, that is, if the local node and the home node coincide with each other, the request and the data do not have to be transmitted and received between nodes. Therefore, there is no latency caused by the transmission and reception, and the addition of the network can be reduced.

It is quite normal that a plurality of nodes use a data block. Even if the software is tuned as much as possible, the use of the same data block by a plurality of cache memories would not be prevented. Therefore, it would be significantly difficult to completely match the local node and the home node. However, in a network configuration in which the distances between the nodes are not all uniform and there are differences in the distances depending on the nodes, even if a plurality of nodes use the same data block, the process can be speeded up by reducing the distance between the processing node and the data by allocating the process to nodes in close distances and performing the tuning to put the data on one of the nodes.

However, access to the memory essentially requires much time. Therefore, if the direction information in the memory is to be read out, the latency in the directory access becomes a bottleneck for improving the performance of the processor. In reality, the directory information in the memory is read out to recognize the target node, and the request is transmitted to the node. Therefore, much time is required to process the request. A longer time is further required if the directory storage unit is under control of another node.

Specifically, this is equivalent to a case illustrated in FIG. 15, for example. FIG. 15 illustrates a case of acquiring data from a cache of a remote node R. In other words, based on a request from a local node L, a directory storage unit of a home node H (a node different from the local node L in this case) is accessed, and then a cache memory of the remote node R is further accessed. Meanwhile, FIG. 16 illustrates a case of acquiring data from a memory of the home node H. The processing time is significantly longer in the case illustrated in FIG. 15 compared to the case illustrated in FIG. 16.

Therefore, a directory cache storage unit that has only part of the directory information can be included to execute fast processing by the home node. The ability to quickly read out part of the directory information from the directory cache storage unit is effective in increasing the speed even if the home node is different from the local node. In other words, a request to another node can be transmitted without accessing the memory, and the process can be speeded up.

For example, there is a known technique in which in a computer system including an integrated directory and a processor cache, a line to be cached is instructed when a directory entry recorded in a cache memory subsystem is in a state of Modified, Exclusive, or Owned, and the absence of the directory entry indicates that the line is cached in a Shared or Invalid state.

Patent Document 1: Japanese National Publication of International Patent Application No. 2006-501546

SUMMARY

According to an aspect of the invention, a computer includes a memory that stores data, a cache memory that stores a copy of the data, a directory storage unit that stores directory information related to the data and includes information indicating that the data is copied to the cache memory, a directory cache storage unit that stores a copy of the directory information stored in the directory storage unit, and a control unit that controls storage of data in the directory cache storage unit, manages the data copied from the memory to the cache memory by dividing the data into an exclusive form and a shared form, and sets a priority of storage of the directory information related to the data fetched in the exclusive form in the directory cache storage unit higher than a priority of storage of the directory information related to the data fetched in the shared form in the directory cache storage unit.

BRIEF DESCRIPTION OF DRAWINGS

FIG. 1 is a diagram illustrating a configuration of a computer system;

FIG. 2 is a diagram for explaining a process executed by a controller;

FIG. 4 is a diagram illustrating a configuration of the controller;

FIG. 11 is a diagram illustrating a processing flow of exclusive-type read;

FIG. 12 is a diagram illustrating a processing flow of shared-type priority eviction;

FIG. 16 is a diagram for explaining processing time according to an acquisition path of data;

FIG. 17 is a diagram illustrating states of shared-type requests; and

DESCRIPTION OF EMBODIMENTS

Figure 3B:
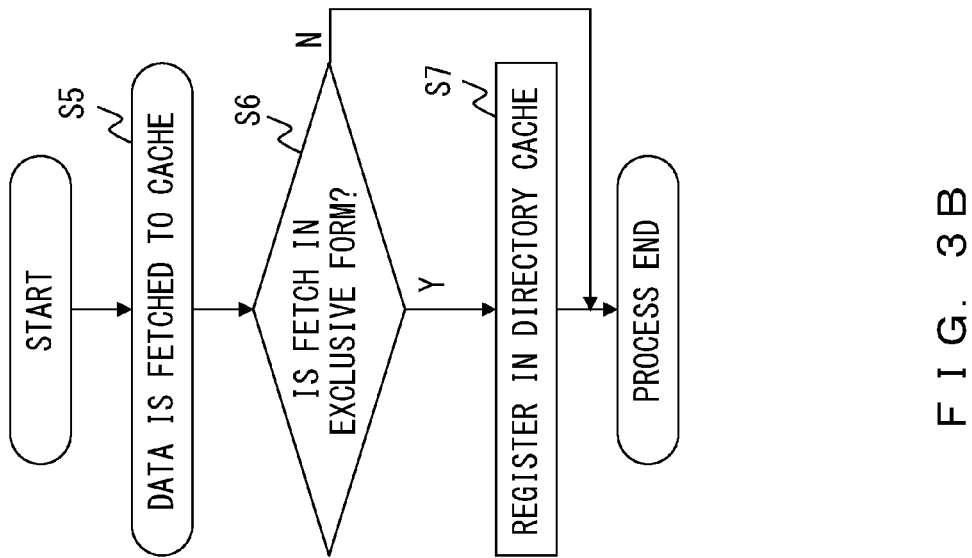
FIG. 3 is a registration processing flow of a directory cache executed by the controller.

As described, to speed up the entire computer system, the directory cache storage unit needs to be efficiently used. Therefore, the present inventor has examined to limit information registered in the directory cache storage unit to efficiently use the directory cache storage unit.

New acquisition requests of data issued from processors are classified into shared-type requests and exclusive-type requests. The requests can be further divided as follows based on circumstances of data to be acquired being fetched to cache memories.

The shared-type requests are further divided into three states as shown in FIG. 17.

A first state of the shared-type request is, as shown in FIG. 17(A), a state in which there is a possibility that a data block requested by the local node L is rewritten in a cache memory (cache memory of the remote node R), i.e. a state in which the requested data block is already in an exclusive form and fetched to a cache memory. In other words, the first state of the shared-type request is a case in which the requested data is in an exclusive form and fetched to the remote node R. Therefore, the remote node R holds the latest data in the cache memory in an exclusive form. In this case, the latest data block needs to be acquired from the cache memory. The data block of the cache memory needs to be invalidated as necessary. Therefore, the first state of the shared-type request is a state in which it is required to access the cache of the remote node R after access to the directory of the home node H and is a state in which the processing time is significantly long.

The data (or data block) fetched from a node to a cache memory of another node in an exclusive form will be called "data fetched in an exclusive form".

A second state of the shared-type request is, as shown in FIG. 17(B), a state in which a data block requested by the local node L is fetched to a cache memory (cache memory of the remote node R), but there is no possibility that the data block will be rewritten. In other words, the second state of the shared-type request is a case in which the requested data is fetched to the remote node R in a shared form. Therefore, the remote node R holds the latest data in the cache memory in a shared form. In this case, the requested data block can be acquired from the memory. Therefore, in the second state of the shared-type request, only access to the home node H is necessary, and access to the remote node R is not necessary.

Data (or data block) fetched from a node to a cache memory of another node in a shared form will be called "data fetched in a shared form".

A third state of the shared-type request is, as shown in FIG. 17(C), a state in which a data block requested by the local node L is not fetched to any cache memory. In other words, the third state of the shared-type request is a case in which the requested data is not fetched to any node. Therefore, the home node H holds the data in the memory or the cache memory. More specifically, the requested data block can also be acquired from the memory in the third state of the shared-type request. In this case, there is no access to the remote node R.

The exclusive-type requests are further divided into three states as shown in FIG. 18.

Figure 18B:
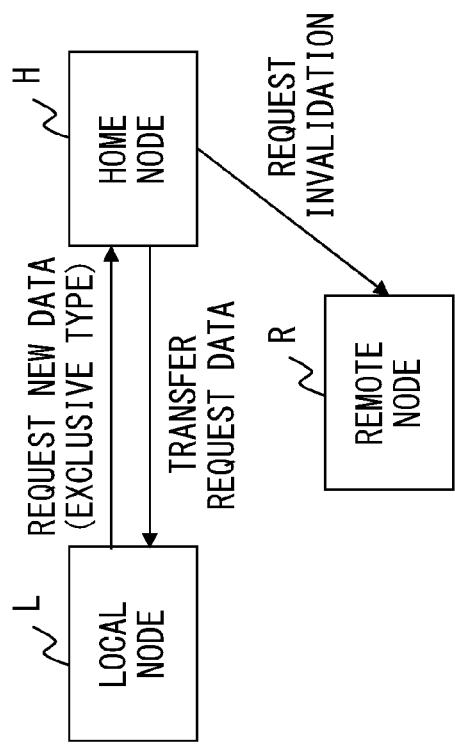
FIG. 18 is a diagram illustrating states of exclusive-type requests.
Figure 18C:
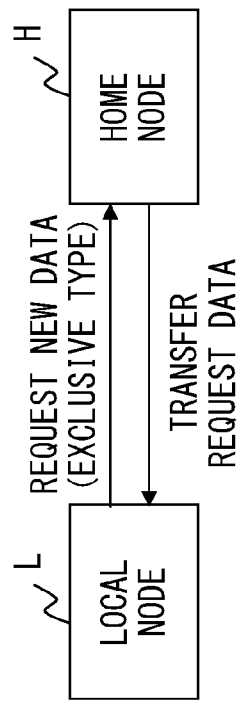
Figure 18A:
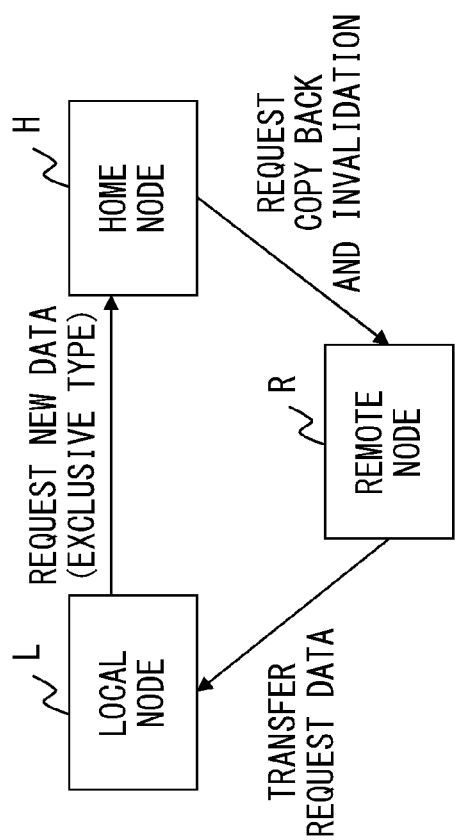

A first state of the exclusive-type request is, as shown in FIG. 18(A), a state in which there is a possibility that a data block requested by the local node L is rewritten in a cache memory (cache memory of the remote node R), i.e. a state in which the requested data block is already fetched to a cache memory in an exclusive form. In other words, the first state of the exclusive-type request is a case in which requested data is fetched to the remote node R in an exclusive form. Therefore, the remote node R holds the latest data in the cache memory in an exclusive form. In this case, the latest data block needs to be acquired from the cache memory. The data block of the cache memory needs to be invalidated as necessary. Therefore, the first state of the exclusive-type request is a state in which it is required to access the cache of the remote node R after access to the directory of the home node H, and the processing time is significantly long.

A second state of the exclusive-type request is, as shown in FIG. 18(B), a state in which a data block requested by the local node L is fetched to a cache memory (cache memory of the remote node R), but there is no possibility that the data block will be rewritten. In other words, the second state of the shared-type request is a case in which the requested data is fetched to the remote node R in a shared form. Therefore, the remote node R holds the latest data in the cache memory in a shared form. In this case, although the requested data block can be acquired from the memory, the data block of the cache memory needs to be invalidated. More specifically, in the second state of the exclusive-type request, the cache of the remote node R needs to be accessed after access to the directory of the home node H, but the data can be acquired just by accessing the home node H.

A third state of the exclusive-type request is, as shown in FIG. 18(C), a state in which a data block requested by the local node L is not fetched to the cache memory. In other words, the third state of the shared-type request is a case in which the requested data is not fetched to any node. Therefore, the home node H holds the data in the memory or the cache memory. In this case, the requested data block can be acquired from the memory. Therefore, there is no access to the remote node R in the third state of the exclusive-type request.

As can be understood from the foregoing, new request data can be acquired from the memory of the home node H for the shared-type new request and the exclusive-type new request, except when the requested data block is already fetched from the memory in an exclusive form. In this case, there is no problem in speeding up the process even if the directory information is read out at the same time with the acquisition of the data from the memory. At this point, the directory information can be in the memory or in a storage device at about the same reading speed as the memory.

In other words, after the access to the home node H, the latest data needs to be acquired from the cache memory of the remote node R only when the requested data block is fetched in an exclusive form. In this case, it is inefficient to access the cache memory of the remote node R after reading a slow directory storage unit existing in the memory of the home node H. Therefore, it is better to use a high-speed directory cache storage unit in this case, instead of reading the directory information existing in a low-speed memory.

In this way, the use of the directory cache storage unit is basically limited to only for the data block fetched from the memory in an exclusive form. As a result, the directory cache storage unit with a small capacity can be efficiently used, and the latest data block can be quickly acquired when the processor needs to acquire the latest data from another cache.

Next, a process of the shared-type request when the use of the directory cache storage unit is limited as described above will be examined.

For example, when the data acquisition request from the processor is a shared type, access to another cache memory is necessary only when the data block to be processed is fetched to the other cache memory in an exclusive form.

Meanwhile, a request for invalidating the cache memory needs to be issued when the data acquisition request from the processer is an exclusive type and the data block to be processed is already fetched to another cache memory in a shared form. To issue the request for invalidating the cache memory, fetch information needs to be read out from the directory storage unit prior to the issue. However, in other words, only an invalidation process is necessary, and the data block can be acquired from the memory. Therefore, there is no problem in executing the data acquisition request.

As described later with reference to FIG. 5, the fetch information is information indicating fetched states of data blocks and is part of the directory information.

Next, the necessity of the directory storage unit when the use of the directory cache storage unit is limited as described above will be examined.

If exclusive-type fetch information that should be registered in the directory cache storage unit is evicted by replacement, a competitive directory mistake occurs. However, even in this case, installation of a directory storage unit that has all information allows acquiring necessary information. In this case, although the access speed is reduced, there is no problem in processing the request if the directory storage unit is accessed. Therefore, the directory storage unit with all information is arranged separately from the directory cache storage unit to easily solve the competitive directory mistake that is predicted when the use of the directory cache storage unit is limited as described above.

Meanwhile, eviction in the directory cache storage unit is an important issue to efficiently use the directory cache storage unit with a small capacity. For example, if a new entry needs to be registered when the directory cache storage unit is already full, one of the data (directories) needs to be evicted from the directory cache storage unit. However, the eviction of the directory can be easily processed by arranging the directory storage unit (full directory) that can have information of all fetched blocks.

Specifically, in a directory cache storage unit of a write-through system, the same entry always exists in the directory storage unit. Therefore, one of the entries can be overwritten by a new entry. In a directory cache storage unit of a write-back system, it is necessary only to write the evicted entry in the directory storage unit.

However, if there is no directory storage unit, another process needs to be executed to prevent a problem when the directory information is lost. For example, the process needs to be completed by requesting the node with a cache copy to discard the data and to write the data back to the memory. Therefore, if there are frequent evictions, the communication traffic between processors increases. As a result, the performance of the processor is reduced.

Next, processing of a data block fetched in a shared form when the use of the directory cache storage unit is limited as described above will be examined.

It is impossible not to have any information of a data block fetched in a shared form. For example, there is a case in which a data block fetched in a shared form needs to be acquired in an exclusive form. In this case, if there is no information of the data block fetched in a shared form, there is no means for recognizing the data block fetched in a shared form, and the data block cannot be invalidated. Therefore, the cache coherency cannot be maintained.

In this case, the node with the data block fetched in a shared form can be found by snooping the cache memory. However, even in this case, information indicating that the data block is fetched is at least necessary. If there is no information indicating that the data block is fetched, all cache memories need to be snooped to just check which node has the data block fetched in a shared form.

As described, the fetch information of the data block fetched in a shared form is basically not stored in the directory cache storage unit. This is to reduce the frequency of the eviction and to suppress the increase in the communication traffic between processors.

However, for example, in a period just after the activation of the computer system, there can be enough room in the entry of the directory cache storage unit. In this case, the eviction would scarcely occur even if the fetch information of the data block fetched in a shared form is registered in the directory cache storage unit. Rather, the acquisition of the data block from another cache memory by the processor could be faster than the acquisition of the data block from the memory in this case. If a request for invalidation is necessary, the request for invalidation can be issued faster.

Therefore, although the fetch information of the data block fetched in a shared form is basically not stored in the directory cache storage unit, the information may be stored if there is a space in the directory cache storage unit instead of not storing the information at all. In other words, when the information is stored, the fetch information can be stored by prioritizing the fetch information of the data block fetched in an exclusive form over the fetch information of the data block fetched in a shared form. During the replacement, if more than a predetermined proportion of fetch information is stored in the directory cache storage unit, the fetch information can be evicted by prioritizing the fetch information of the data block fetched in a shared for over the fetch information of the data block fetched in an exclusive form.

Meanwhile, the eviction of directory can be considered as follows when the entire fetch information of the data block fetched in an exclusive form is stored in the directory cache storage unit. More specifically, to evict an exclusive-type entry, information in the directory cache storage unit needs to be used to issue, to a processor with an exclusive-type data block, a write-back request of the data block to be processed to the memory. However, the write-back request does not have to be issued to a processor with a shared-type data block. Therefore, just the storage of the entire fetch information of the data block fetched in an exclusive form in the directory cache storage unit is sufficiently effective in reducing the frequency of eviction.

The summary of the foregoing is as follows. The target of the registration to the directory cache storage unit is reduced to use the directory cache storage unit efficiently. Therefore, directory information that does not pose any problem without registration is not registered or preferentially evicted.

The directory information that does not pose any problem without registration is directory information of a data block fetched in a shared form. This is due to the following reason. There is no need to access another cache memory for the data block fetched in a shared form, and the data can be directly obtained from the memory. Therefore, the memory access and the directory access can be performed at the same time to acquire necessary data and directory information in parallel, and the fact that the data is not fetched to the cache memory can be checked.

On the other hand, the fetch of the data block fetched in an exclusive form generates access to another cache memory. Therefore, the fetch information has to be recognized as early as possible. Thus, the fetch information of the data block fetched in an exclusive form is always registered or preferentially registered in the directory cache storage unit.

For the foregoing reasons, both the directory storage unit and the directory cache storage unit are provided. The cache system normally operates even if there is no fetch information of the data block fetched in an exclusive form or the data block fetched in a shared form in the directory cache storage unit. Particularly, it is sufficient to reference the directory storage unit for the fetch information of the data block fetched in a shared form.

First Embodiment

In this embodiment, a directory is provided in addition to the directory cache storage unit, and the following protocol is set for the registration of the fetch information of the data block to the directory cache storage unit. More specifically, the fetch information of the data block fetched in an exclusive form is preferentially registered. The fetch information of the data block fetched in a shared form is registered if there is a space in the directory cache storage unit.

FIG. 1 is a diagram showing a configuration of a computer system according to an embodiment of the present invention. FIG. 2 is a diagram for explaining a process executed by a controller shown in FIG. 1.

The computer system includes a plurality of nodes 1 and a plurality of I/O (Input/Output) devices 2. The nodes 1 are interconnected with other nodes 1 via a network. The plurality of nodes 1 transmit and receive data to and from the nodes 1. The I/O devices 2 are arranged corresponding to the nodes 1. The I/O devices 2 are, for example, input/output devices such as hard disks.

The plurality of nodes 1 have the same configuration. Each node 1 includes a processor 11, a controller 12, a directory cache storage unit 13, a memory 14, a directory storage unit 15, and an I/O control unit 16. The processor 11 includes a cache memory 111.

As described, it is assumed that a processor has issued a request for a data block. The node to which the processor of the request source belongs will be called a "local node". The node to which the memory including the data block to be processed belongs will be called a "home node". In other words, the home node is a node including the directory storage unit that manages the data block to be processed. When a response is generated from another cache memory as a result of the request, the node to which the cache memory belongs is called a "remote node".

The processor 11 executes programs in the memory 14. In this regard, the processor 11 designates a memory address through the controller 12 to reference the memory 14. The processor 11 transmits and receives data to and from the processors 11 of the other nodes 1 through the controller 12. The processor 11 further writes data in the memory 14 and reads out data from the memory 14 through the controller 12.

The memory 14 is a main storage device for the processor 11 to store data 141. The memory 14 stores the data 141 including programs. The data 141 stored in the memory 14 includes a plurality of data blocks. The data blocks are units of access such as writing and reading in the memory 14. The "data block" is data constituting a part of the data 141 and is a storage area that stores the data block in the memory 14.

The memory 14 is shared by a plurality of nodes 1. In reality, a plurality of data blocks in one memory 14 are allocated in advance to the nodes 1. In other words, a plurality of data blocks used by each node 1 are predetermined.

The cache memory 111 stores a copy of the data 141 stored in the memory 14. The fact that a data block of the memory 14 is copied to the cache memory 111 will be referred to as the "data block is fetched".

The cache memory 111 is a low-capacity, high-speed memory compared to the memory 14. The cache memory 111 stores not only the data blocks of the memory 14 of the node 1, but also data blocks of the memories 14 of the other nodes 1. In other words, the cache memory 111 of the node 1 stores data blocks fetched from the other nodes 1.

The directory storage unit 15 stores directory information (displayed "information" in FIG. 2) 151 related to the data 141 stored in the memory 14. The directory information 151 is information for managing the cache that has fetched data and the state of the data. Therefore, the directory information 151 instructs the cache memory 111 that owns a copy of a data block. The directory information 151 includes at least information indicating the fact that the data is copied to the cache memory 111, i.e. the fact that the data is fetched.

The directory storage unit 15 is a storage area for storing the directory information 151, and for example, is a storage device that operates at a similar speed as a storage device which is the memory 14. The directory storage unit 15 may be provided on the memory 14.

Like the memory 14, the directory storage unit 15 is shared by a plurality of nodes 1. In reality, a plurality of entries in one directory storage unit 15 are allocated to the nodes 1 in advance. In other words, a plurality of entries used by each node 1 are predetermined. As described later, the directory storage unit 15 is a full directory.

The directory cache storage unit 13 has a storage area that stores part of the directory information 151 of the directory storage unit 15. The directory cache storage unit 13 stores a copy (displayed "information" in FIG. 2) 131 of the directory information 151 stored in the directory storage unit 15.

The directory cache storage unit 13 is, for example, a low-capacity, high-speed storage device compared to a storage device, which is the directory storage unit 15, and is a storage device that operates at a similar speed as a storage device, which is the cache memory 111. Since the capacity of the directory cache storage unit 13 is smaller than that of the directory storage unit 15, the directory cache storage unit 13 cannot store all directory information 151 of the directory storage unit 15.

In response to a request from the processor 11, the controller 12 accesses the directory cache storage unit 13, the memory 14, and/or the directory storage unit 15. More specifically, the controller 12 stores (or writes) data in the memory 14 or reads out data from the memory 14. The controller 12 stores (or writes) the directory information 151 in the directory storage unit 15 or reads out the directory information 151 from the directory storage unit 15.

In response to a request from the processor 11, the controller 12 controls the I/O device 2 through the I/O control unit 16. The I/O control unit 16 receives a request from the processor 11 through the controller 12 to transmit and receive data to and from the I/O device 2.

In response to a request from the processor 11, the controller 12 communicates with the controllers 12 of the other nodes 1 via a network to transmit and receive data. Specifically, the plurality of nodes 1 mutually transmit and receive various requests and data blocks in the memories 14. As a result, the memories 14 are shared by the plurality of nodes 1.

The controller 12 divides the data copied to the cache memory 111 into an exclusive type and a shared type to manage the data. The controller 12 sets the priority of storage of the directory information 151 related to the data fetched in an exclusive form in the directory cache storage unit 13 higher than the priority of storage of the directory information 151 related to the data fetched in a shared form in the directory cache storage unit 13.

Figure 3A:
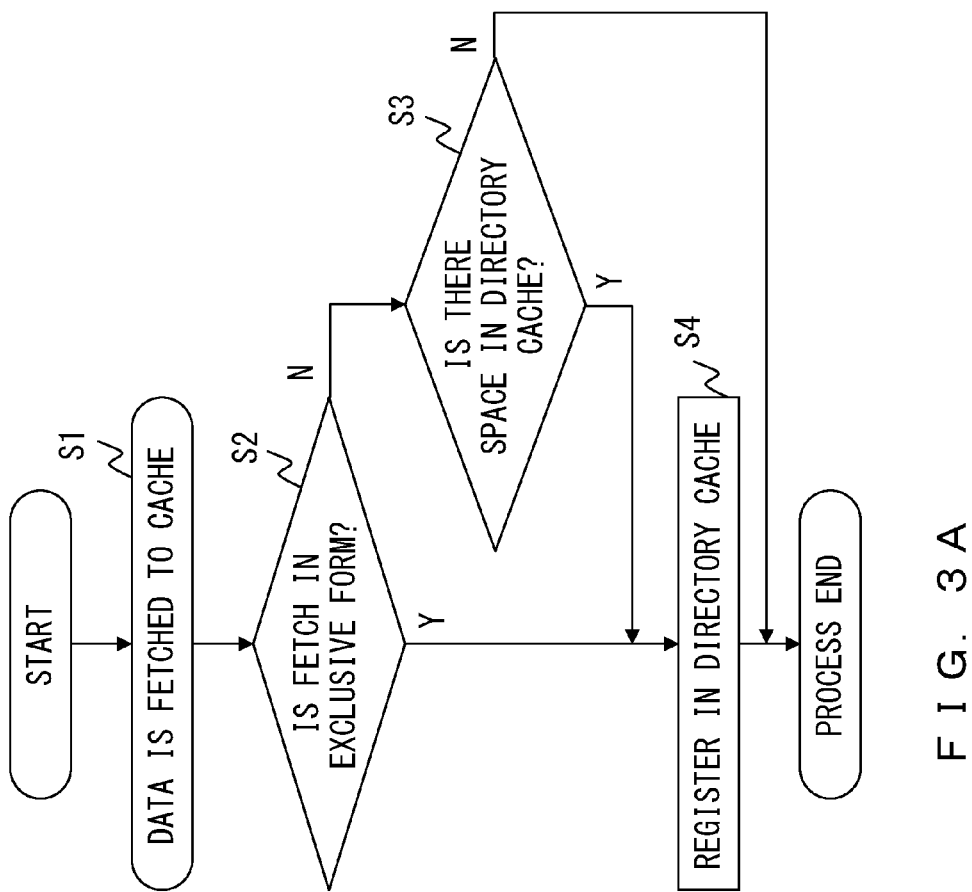

Specifically, the controller 12 executes a process shown in FIG. 3(A) in the first embodiment. FIG. 3(A) is a registration processing flow of a directory cache executed by the controller shown in FIG. 1.

When data is fetched to the cache memory 111 (step S1), the controller 12 checks whether or not the fetch is in an exclusive form (step S2). If the fetch is in an exclusive form (step S2 YES), the controller 12 stores, in the directory cache storage unit 13, the copy 131 of the directory information 151 related to the data fetched in an exclusive form (step S4). If the fetch is not in an exclusive form, in other words, if the fetch is in a shared form (step S2 NO), the controller 12 further checks whether there is a space in the directory cache storage unit 13 (step S3). If there is a space in the directory cache storage unit 13 (step S3 YES), step S4 is executed. As a result, the copy 131 of the directory information 151 related to the data fetched in a shared form is stored in the directory cache storage unit 13. If there is no space in the directory cache storage unit 13 (step S3 NO), the process ends.

As a result of the process, the controller 12 stores the directory information 151 in the directory cache storage unit 13 by prioritizing the directory information 151 related to the data fetched in an exclusive form over the directory information 151 related to the data fetched in a shared form. The controller 12 stores, in the directory cache storage unit 13, the directory information 151 related to the data fetched in a shared form if there is a space in the directory cache storage unit 13.

As a result, if the directory cache storage unit 13 is searched and the data is not hit, the data can be acquired from the memory of the home node, and the acquired data can be used. If the directory cache storage unit 13 is searched and the data is hit, the cache memory 111 can be immediately accessed to acquire the data based on the fetch information in the directory cache storage unit 13. Therefore, the directory cache storage unit 13 can be used to quickly recognize the fetch of data to a cache with an exclusive right, and the cache can be used highly efficiently.

In this way, both the directory storage unit 15 that has all fetch information and the directory cache storage unit 13 are arranged and the information registered in the directory cache storage unit 13 is limited. Therefore, the processor as the request source can efficiently acquire the state information of the cache in relation to the directory cache storage unit 13 that cannot secure a large capacity, without posing a problem on the use of the directory storage unit 15 by replacement and the like. As a result, the computer system can be further speeded up.

As described, the data needs to be acquired not from the memory of the home node, but from the cache that has fetched the data in order to acquire the data fetched to the cache in an exclusive form. However, the processing time is significantly long if the cache of the remote node is accessed after checking the large-capacity directory in the home node. Therefore, the information related to the data fetched in an exclusive form is placed on the directory cache storage unit 13. This can significantly reduce the processing time. If the data is not fetched in an exclusive form, the data can be directly acquired from the memory of the home node. Therefore, the priority of the directory cache registration can be lowered.

Next, the directory storage unit 15 and the directory cache storage unit 13 will be described.

The controller 12 uses the directory storage unit 15 to manage the internal state of the memory 14. If data is fetched from the memory 14 to the cache memory 111, the controller 12 sets, to the directory storage unit 15, information indicating that the data is fetched. For example, predetermined one bit in an entry of the directory storage unit 15 is used for the information. Specifically, a bit (valid bit) indicating the validity of the entry is used.

The controller 12 also sets, to the directory storage unit 15, information indicating that the data is fetched while an exclusive right that allows writing is acquired, or information (state information) indicating that the data is fetched in a shared state that does not allow writing. For example, predetermined two bits in an entry of the directory storage unit 15 are used for the state information. Specifically, if the two bits indicate "00", the information indicates invalid (no fetch). If the two bits indicate "10", the information indicates that the data is fetched in a shared form. If the two bits indicate "11", the information indicates that the data is fetched in an exclusive form.

The controller 12 sets, to the directory storage unit 15, information indicating to which cache memory 111 the data is fetched. For example, predetermined one bit in an entry of the directory storage unit 15 is used for the information.

FIG. 4 is a diagram showing an example of a configuration of the controller shown in FIG. 1.

As shown in FIG. 4, the controller 12 includes, for example, a memory buffer 121, a directory information buffer 122, a memory request buffer 123, and a hit determination circuit 124.

The memory request buffer 123 receives a read request of the memory 14 along with a memory address A from the processor 11. In response, the memory request buffer 123 uses the memory address A to search the directory cache storage unit 13. The memory request buffer 123 inputs the search result to the hit determination circuit 124.

The hit determination circuit 124 determines whether or not the address A is hit (cache hit) based on the search result inputted from the directory cache storage unit 13. The hit determination circuit 124 inputs the determination result to the memory request buffer 123.

If the determination result inputted from the hit determination circuit 124 indicates the cache hit, the memory request buffer 123 transfers the read request of data to the processor 11 of another node 1 and transmits an invalidation request as necessary.

Meanwhile, if the determination result inputted from the hit determination circuit 124 does not indicate the cache hit, the memory request buffer 123 uses the memory address A to access the memory 14 to read out the data block. The read out data block is temporarily held in the memory buffer 121. Concurrently, the memory request buffer 123 uses the memory address A to access the directory storage unit 15 to read out the directory information 151. The read out directory information 151 is temporarily held in the directory information buffer 122.

Subsequently, the directory information 151 of the directory information buffer 122 is inputted to the memory request buffer 123. The memory request buffer 123 generates directory update information, i.e. new directory information 151, based on the directory information 151 received from the directory information buffer 122. The memory request buffer 123 further stores the generated directory update information in the directory storage unit 15 through the directory information buffer 122. As a result, the directory information 151 of the directory storage unit 15 is updated. Concurrently, the memory request buffer 123 updates the copy 131 of the directory information 151 of the directory cache storage unit 13 based on the generated directory update information.

The directory information 151 of the directory information buffer 122 is inputted to the memory buffer 121. Accordingly, the memory buffer 121 transmits the data block read out from the memory 14 to the processor 11 as memory read data.

Figure 5:
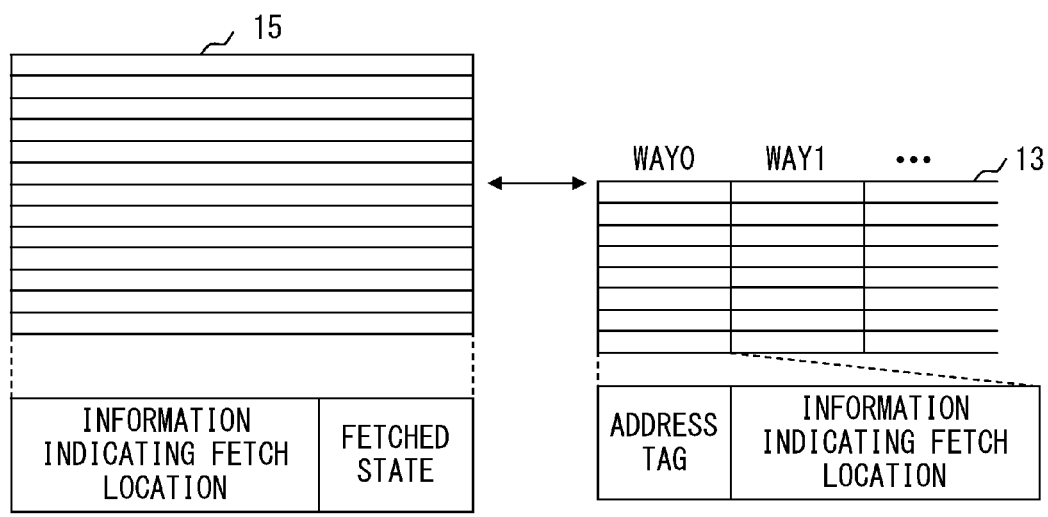
FIG. 5 is a diagram illustrating an entry structure of a directory.

FIG. 5 is a diagram showing an example of entry structures of the directory storage unit 15 and the directory cache storage unit 13.

The directory storage unit 15 includes a plurality of entries. The entries correspond one-to-one with the reading unit of the memory 14, i.e. the data blocks. In other words, the directory storage unit 15 includes corresponding entries for all data blocks of the memory 14. Therefore, the directory storage unit 15 is a full directory.

The entries of the directory storage unit 15 store the directory information 151. The directory information 151 includes, for example, information indicating a fetch location (hereinafter, also called as positional information) and a fetched state (also called as fetch state). The positional information is, for example, positional information of a cache memory as a destination of the fetch. The fetched state is, for example, one of a shared type, an exclusive type, and no fetch. Corresponding data blocks are determined by the entries. Therefore, the controller 12 recognizes the data block, the state of the data block, and the cache memory 111 to which the data block is fetched, based on the directory information 151 and the entry that stores the directory information 151.

In accordance with the address tags, the entries of the directory cache storage unit 13 store the copy 131 of the directory information 151 of the directory storage unit 15 fetched to the cache memory 111. However, in reality, the entries of the directory cache storage unit 13 of FIG. 5 store the positional information and do not store the fetched state. Therefore, the directory cache storage unit 13 stores the copy 131 of part of the directory information 151 of the directory storage unit 15.

Figure 6:
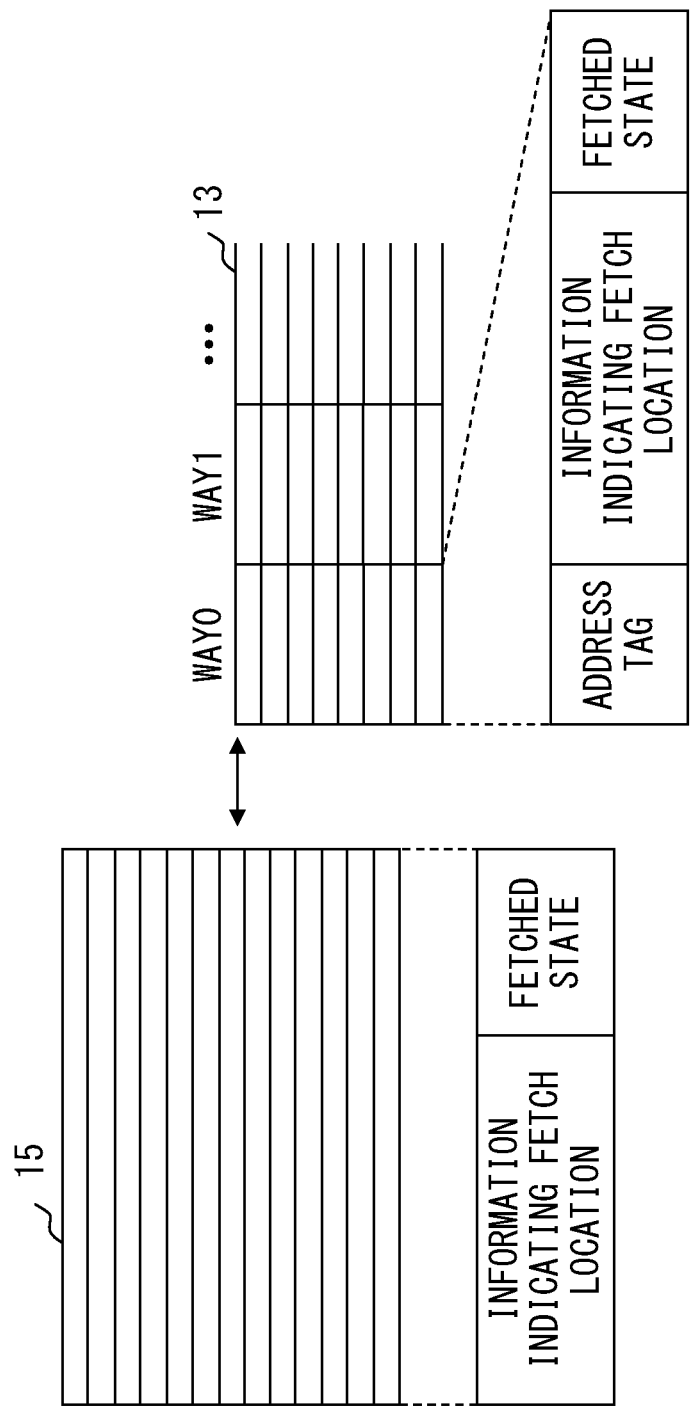
FIG. 6 is a diagram illustrating an embodiment of the entry structure of the directory.

FIG. 6 is a diagram showing another example of the entry structures of the directory storage unit 15 and the directory cache storage unit 13.

The directory storage unit 15 of FIG. 6 has the same configuration as the directory storage unit 15 of FIG. 5 and stores the same directory information 151 as the directory storage unit 15 of FIG. 5. The directory cache storage unit 13 of FIG. 6 has the same configuration as the directory cache storage unit 13 of FIG. 5, but stores the same directory information 151 as the directory storage unit 15 of FIG. 5. Therefore, in accordance with the address tags, the entries of the directory cache storage unit 13 of FIG. 6 store the copy 131 of the directory information 151 of the directory storage unit 15 fetched to the cache memory 111. Therefore, the entries of the directory cache storage unit 13 of FIG. 6 store the positional information and the fetched state.

Which of the directory storage unit 15 and the directory cache storage unit 13 of FIG. 5 and the directory storage unit 15 or the directory cache storage unit 13 of FIG. 6 will be used is selected in accordance with, for example, the scale of the control system.

Figure 7:
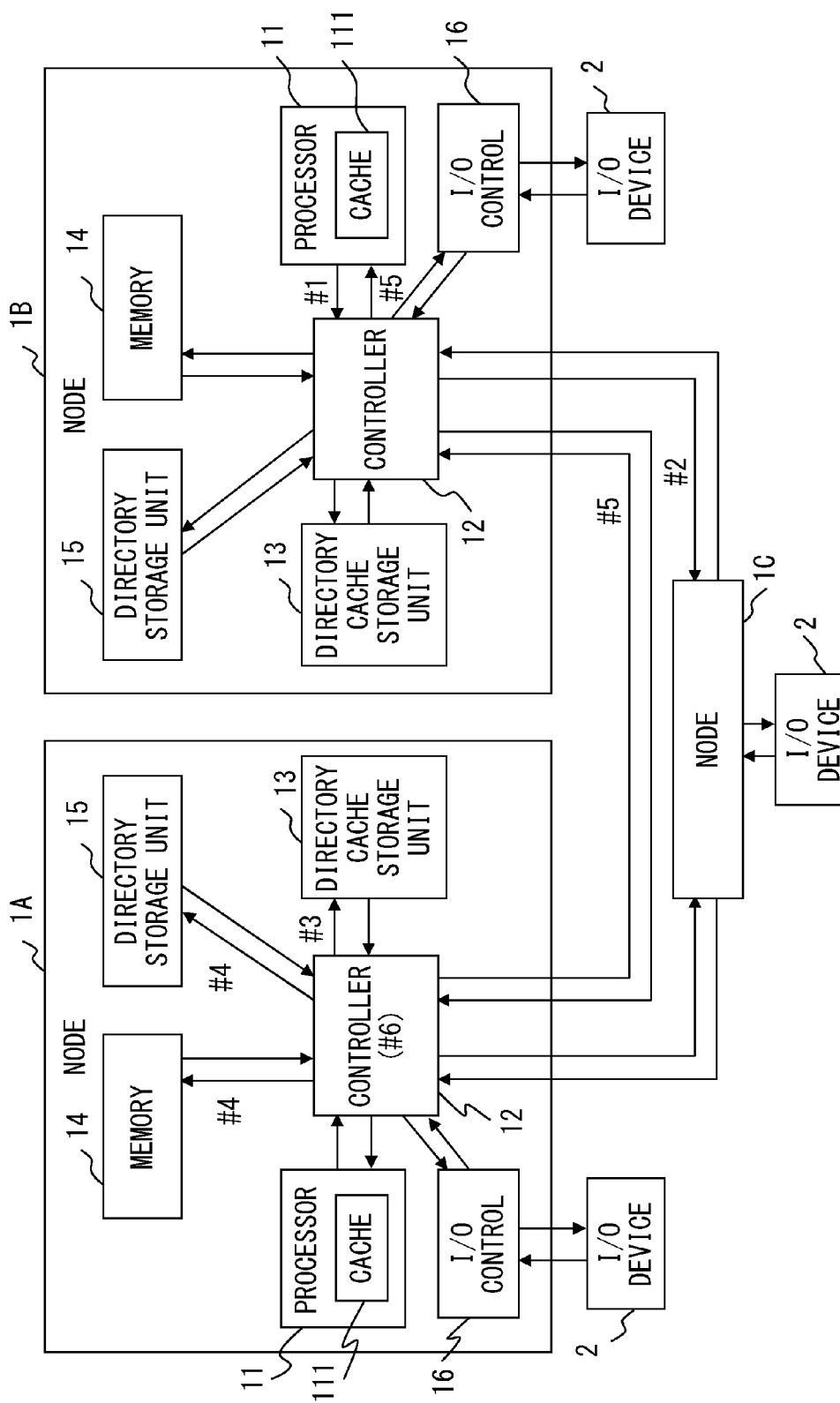
FIG. 7 is a diagram illustrating an operation of memory read.

Next, reading of data from the memory 14 when an acquisition request of data fetched in a shared form (hereinafter, shared-type data acquisition request) is issued will be described with reference to FIG. 7. FIG. 7 is a diagram showing an operation of memory read.

It is assumed that the processor 11 of a node 1B has sent a shared-type data acquisition request to an address d (see FIG. 10) included in the memory 14 of a node 1A (#1). The shared-type data acquisition request is sent to the node 1A through the controller 12 (#2), and the controller 12 in the node 1A receives and processes the request.

The controller 12 searches the directory cache storage unit 13. As a result of the search, if there is a mishit (#3), the controller 12 reads out the fetch information of the cache memory 111 from the directory storage unit 15 (#4) and reads out the data of the address d from the memory 14 (#4). If the information of the directory storage unit 15 indicates that the data is not fetched or is fetched in a shared form, the controller 12 transmits the read out data to the node 1B (#5).

If the information of the directory storage unit 15 indicates that the data is fetched in an exclusive form, the controller 12 transmits the shared-type data acquisition request to the node that is fetching the data.

In the node 1B, the controller 12 of the node 1B receives the data transmitted from the controller 12 of the node 1A and transfers the data to the processor 11 of the node 1B (#5). The controller 12 of the node 1A further updates the directory storage unit 15 of the node 1A (#6) and registers information indicating that the cache memory 111 of the node 1A shares the data. At this point, if there is a space in the directory cache storage unit 13 of the node 1A, the shared information of the data block to be processed may be registered in the same way as in the directory storage unit 15 of the node 1A.

When the write-back system is adopted, new directory information 151 may be registered only in the directory cache storage unit 13 without updating the directory storage unit 15 if there is a space in the directory cache storage unit 13. The directory storage unit 15 may be updated only at the eviction of entry by replacement or the like of the entry.

Figure 8:
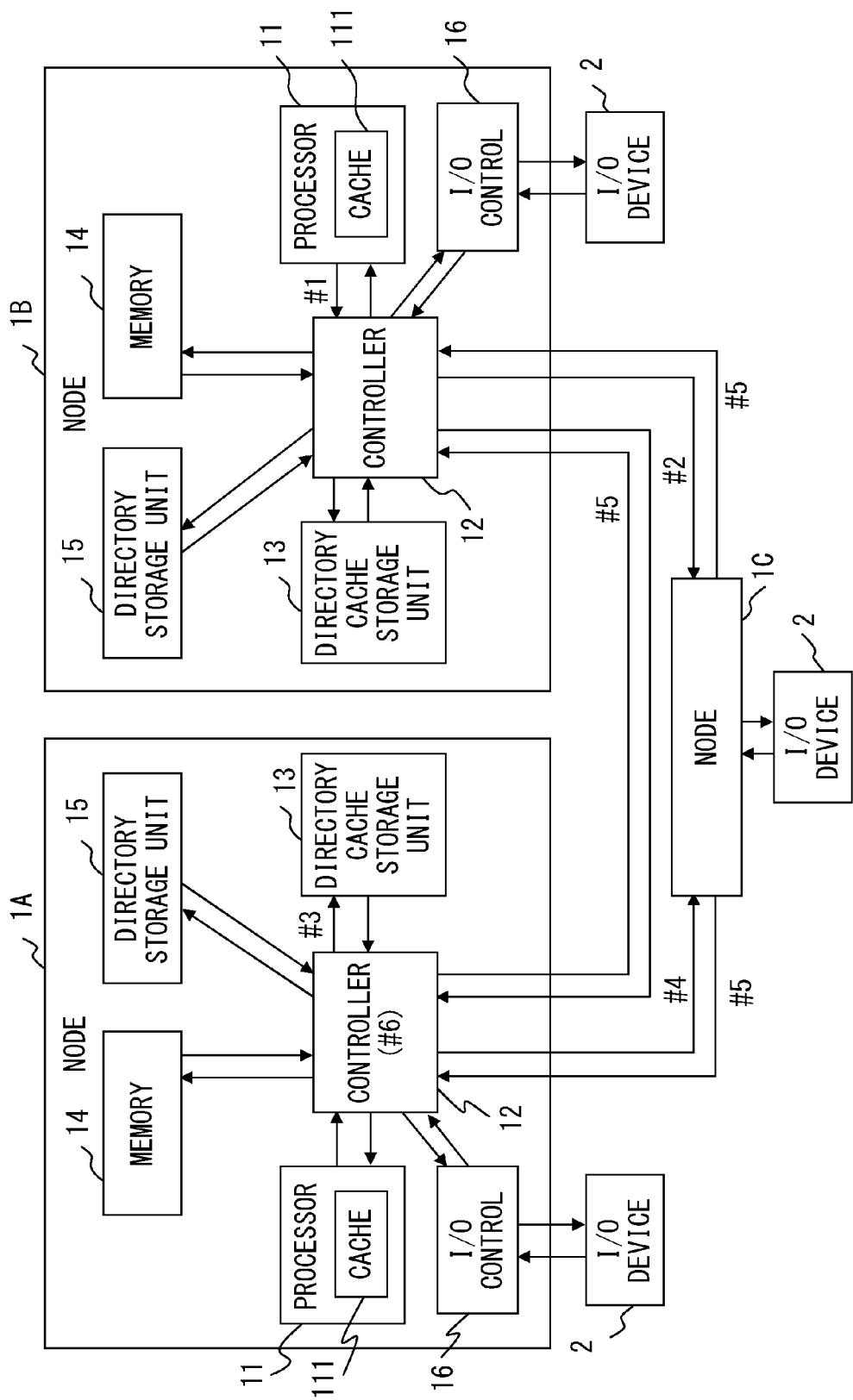
FIG. 8 is a diagram illustrating an operation of cache read.

Next, reading of data from the cache memory 111 when a shared-type data acquisition request is issued will be described with reference to FIG. 8. FIG. 8 is a diagram showing an operation of cache read.

It is assumed that the processor 11 of the node 1B has sent a shared-type data acquisition request to the address d included in the memory 14 of the node 1A (#1). The shared-type data acquisition request is sent to the node 1A (#2), and the controller 12 of the node 1A receives and processes the request.

The controller 12 searches the directory cache storage unit 13. If there is a hit (#3) as a result of the search, the controller 12 of the node 1A transmits the data acquisition request to a node 1C in a shared form (#4). The controller 12 of the node 1A transmits, to the controller 12 of the node 1B, the fact that the data acquisition request is transmitted to the node 1C in a shared form (#5).

In the node 1C, the controller receives the data acquisition request in a shared form and requests the processor for the data block. In response to the request, the processor transmits the data block to the controller. The controller transfers the received data to the node 1B (#5). At the same time, the controller of the node 1C changes the data block fetched in an exclusive form in the cache memory of the node 1C to a shared form.

If the data block of the cache memory of the node 1C is updated and is different from the memory of the node 1C (data is dirty), the controller of the node 1C writes the data block back to the memory of the node 1C. The controller of the node 1C further transmits, to the node 1A to which the address d belongs, information indicating that the data block is transferred in a shared form (#5).

The controller 12 of the node 1A that has received the information updates the information of the directory storage unit 15 (#6) to register information indicating that the cache memory 111 of the node 1C and the cache memory 111 of the node 1B share the data.

As described, since the data block fetched in an exclusive form is changed to a shared form, the controller 12 deletes the information of the directory cache storage unit 13 or updates the information to a shared form. When the write-back system is adopted, the directory storage unit 15 is not updated, and only the directory cache storage unit 13 is updated.

Figure 9:
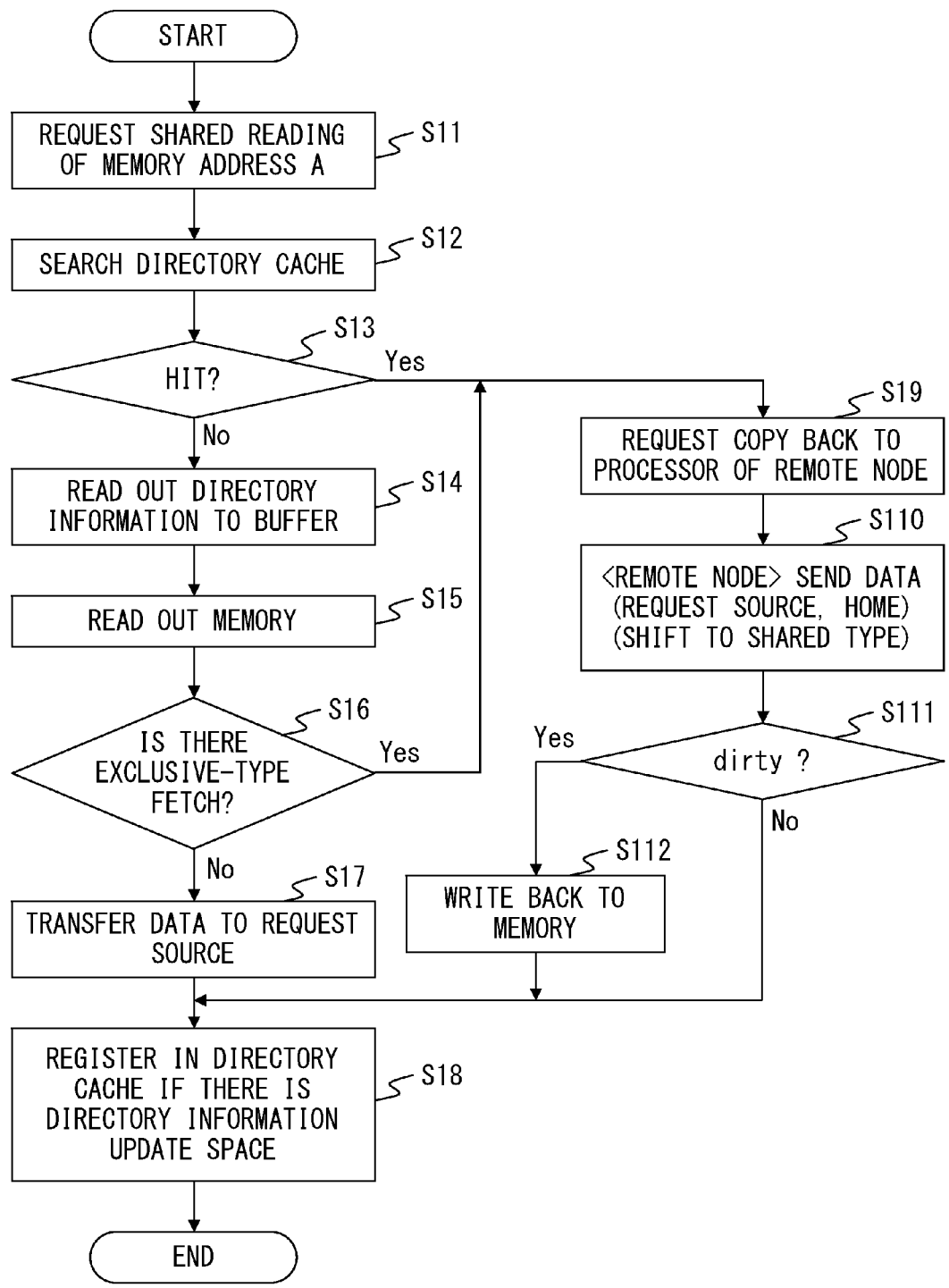
FIG. 9 is a diagram illustrating a processing flow of shared-type read.

FIG. 9 is a diagram showing a read processing flow of a data block fetched in a shared form and shows the reading process of the data block shown in FIGS. 7 and 8.

The processor 11 issues a shared read request of the memory address A to the controller 12 (step S11). In response to it, the controller 12 searches the directory cache storage unit 13 (step S12) and determines whether the cache is hit (step S13).

If the cache is not hit (step S13 No), the controller 12 reads out the directory information 151 to the directory information buffer 122 (step S14) and reads out the data from the memory 14 (step S15).

Subsequently, the controller 12 determines whether or not there is an exclusive-type fetch based on the read out directory information 151 (step S16). If there is no exclusive-type fetch (step S16 No), the controller 12 transfers the data to the copy request source (step S17). Subsequently, if there is a space in the directory cache storage unit 13, the controller 12 registers the copy 131 of the directory information 151 and updates the directory information 151 (step S18).

If there is an exclusive-type fetch in step S16 (step S16 Yes), step S19 is executed.

If the cash is hit in step S13 (step S13 Yes), the controller 12 requests the processor 11 of the remote node for copy back (step S19).

The remote node transmits the requested data block to the controller 12 of the home node as the request source (step S110). As a result, the remote node makes a transition to the shared type.

Subsequently, the controller 12 determines whether or not the data block to be processed is "dirty" (step S111). If the data block is not "dirty" (step S111 No), step S18 is executed. If the data block is "dirty" (step S111 Yes), the data block to be processed is written back to the memory 14 (step S112), and then step S18 is executed.

Figure 10:
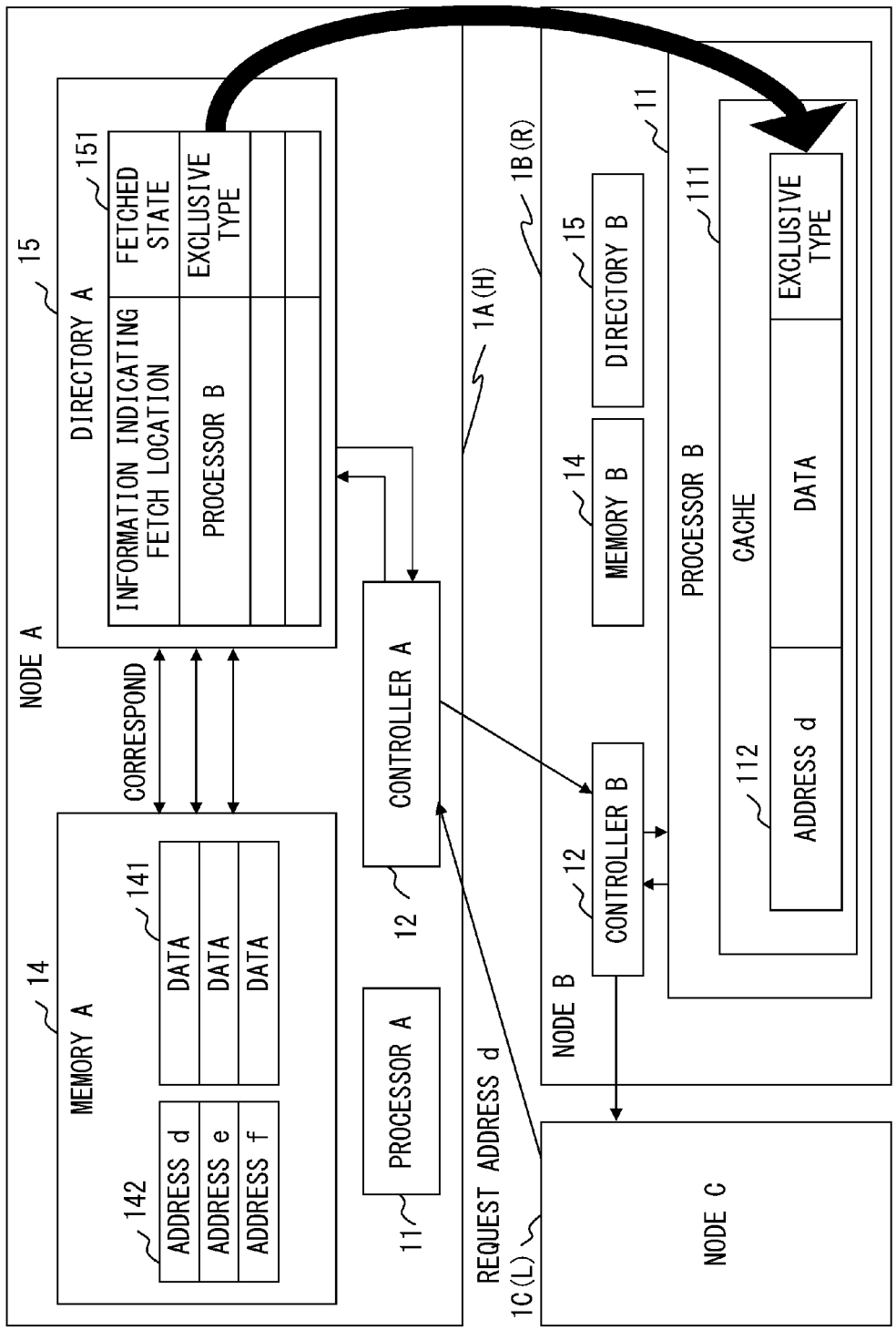
FIG. 10 is a diagram illustrating an operation of memory read.

Next, reading of data from the memory 14 and invalidation of the cache memory 111 when an acquisition request of data fetched in an exclusive form (hereinafter, exclusive-type data acquisition request) is issued will be described with reference to FIG. 10. FIG. 10 is a diagram showing an operation of memory read.

It is assumed that the processor 11 of the node 1C as the local node L has sent an exclusive-type data acquisition request to the address d included in the memory 14 of the node 1A as the home node H. The exclusive-type data acquisition request is sent to the node 1A, and the controller 12 in the node 1A receives and processes the request.

The controller 12 make a search in the directory cache storage unit 13. If the result of the search in the directory cache storage unit 13 is hit, the controller 12 reads out the fetch information of data from the directory cache storage unit 13 to the cache memory 111 and the data 141 of the address d from the memory 14. In this case, the directory information 151 of the directory storage unit 15 indicates, for example, that the data 141 of the address d is fetched in an exclusive form and the fetch destination (remote node R) is the processor 11 of the node 1B. Therefore, the copy 131 of the directory information 151 of the directory cache storage unit 13 indicates the same content as the directory information 151. Based on the result of the process, the controller 12 requests the node 1B as the remote node R to copy (copy back) and invalidate the data 141 of the address d copied to the cache memory 111 of the node 1B.

In the node 1B that has received the request, the controller 12 transmits the data 141 read out from the memory 14 to the node 1C. The controller 12 also transmits the data 141 read out from the memory 14 to the node 1A and invalidates the data 141 of the address d of the cache memory 111 of the node 1C. This is equivalent to a case of FIG. 18(A).

If the result of the search of the directory cache storage unit 13 is a mishit, the controller 12 reads out the fetch information of data from the directory storage unit 15 to the cache memory 111 and the data of the address d from the memory 14.

If the information of the directory storage unit 15 indicates that the cache memory 111 of the node 1C is fetching the data in a shared form, the controller 12 transmits the data 141 read out from the memory 14 to the node 1B and transmits an invalidation request to the node 1C to invalidate the data block of the cache memory 111 of the node 1C. The node 1C that has received the invalidation request invalidates the data block of the cache memory 111 of the node 1C. This is equivalent to a case of FIG. 18(B).

If the information of the directory storage unit 15 indicates that the data is not fetched, the controller 12 transmits the data 141 read out from the memory 14 to the node 1C. This is equivalent to a case of FIG. 18(C).

In the node 1C, the controller 12 receives the requested data and transfers the data to the processor 11. The controller 12 updates the directory storage unit 15 and registers information indicating that the cache memory 111 of the node 1B owns the data in an exclusive form. In the case of the write-back system, the update is not necessary at this time. The controller 12 also registers the new entry in the directory cache storage unit 13.

FIG. 11 is a diagram showing a read processing flow of a data block fetched in an exclusive form and shows a reading process of the data block shown in FIGS. 7 and 10.

The processor 11 issues an exclusive read request of the memory address A (step S21). In response to it, the controller 12 makes a search in the directory cache storage unit 13 (step S22) to determines whether or not the cache is hit (step S23).

If the cache is not hit (step S23 No), the controller 12 reads out the directory information 151 from the directory storage unit 15 to the directory information buffer 122 (step S24) and reads out the data block from the memory 14 (step S25). Subsequently, the controller 12 determines whether or not there is an exclusive-type fetch based on the read out directory information 151 (step S26).

If there is no exclusive-type fetch (step S26 No), the controller 12 further determines whether or not there is shared-type fetch (step S27).

If there is shared-type fetch (step S27 Yes), the controller 12 requests the processor 11 of the remote node to invalidate the data block to be processed (step S28). In response, the controller 12 of the remote node invalidates the data block to be processed (step S29).

Subsequently, the controller 12 of the remote node transfers the data block to the processor 11 as the request source (step S210). The controller 12 that has received the data block registers the copy 131 of the directory information 151 in the directory cache storage unit 13 and updates the directory information 151 (step S211) to finish the process.

If there is no shared-type fetch in step S27 (step S27 No), the controller 12 executes step S210.

If there is an exclusive-type fetch in step S26 (step S26 Yes), the controller 12 executes step S212.

If the cache is hit in step S23 (step S23 Yes), the controller 12 requests the processor 11 of the remote node for the copy back and the invalidation of the data block (step S212). In response, the controller 12 of the remote node transmits the requested data block to the home node as the request source (step S213).

Subsequently, the controller 12 determines whether the data block to be processed is "dirty" (step S214). If the data block is not "dirty" (step S214 No), step S211 is executed. If the data block is "dirty" (step S214 Yes), the data block to be processed is written back to the memory 14 (step S215), and then step S211 is executed.

Next, a replacement process of an entry of the directory cache storage unit 13 will be described.

When an entry of the directory cache storage unit 13 is newly registered, the entry may be already satisfied. In this case, the entry of the directory cache storage unit 13 needs to be replaced.

For example, in the directory cache storage unit 13 of the write-through system, the content always coincides with the content of the directory storage unit 15. Therefore, the entry can be selected and overwritten. In the directory cache storage unit 13 of the write-back system, the entry to be replaced is written back to the directory storage unit 15.

The entry of the directory cache storage unit 13 to be replaced is selected as follows. If there are shared-type entries, the controller selects the shared-type entries as targets of the replacement and further selects an entry to be replaced from the entries based on an algorithm, such as LRU. If there is no shared-type entry and only exclusive-type entries are registered, the controller 12 selects the exclusive-type entries as targets of the replacement and further selects an entry to be replaced from the entries based on an algorithm, such as the LRU. In this way, the shared-type entries can be preferentially replaced to preferentially register the exclusive-type entries.

FIG. 12 is a diagram showing a processing flow of shared-type priority eviction.

The processor 11 requests the controller 12 to register new directory information 151 to the directory cache storage unit 13 (step S31). In response to it, the controller 12 determines whether or not there is a space in the entries of the directory cache storage unit 13 (step S32).

If there is no space in the entries of the directory cache storage unit 13 (step S32 No), the controller 12 further determines whether or not there is a shared-type entry in the directory cache storage unit 13 (step S33).

If there is no shared-type entry (step S33 No), the controller 12 further determines whether or not the registration request is an exclusive type (step S34).

If the registration request is an exclusive type (step S34 Yes), the controller 12 selects an entry to be evicted from the entries based on the LRU (step S35) and writes the directory information 151 of the selected entry back to the directory storage unit 15 (step S36). Subsequently, the controller 12 registers the copy 131 of the new directory information 151 to the directory cache storage unit 13 (step S37) to finish the process.

If there is a space in the entries of the directory cache storage unit 13 in step S32 (step S32 Yes), step S37 is executed.

If there are shared-type entries in step S33 (step S33 Yes), an entry to be evicted is selected from the shared-type entries based on the LRU (step S38), and then step S36 is executed.

If the registration request is not an exclusive type in step S34 (step S34 No), the controller 12 does not register the copy 131 of the new directory information 151 to the directory cache storage unit 13 (step S39). Therefore, the new directory information 151 is registered only in the directory storage unit 15.

Second Embodiment

In this embodiment, the directory storage unit 15 is provided in addition to the directory cache storage unit 13, and the following protocol is set for the registration of the fetch information of the data block to the directory cache storage unit 13. More specifically, the fetch information of the data block fetched in an exclusive form is always registered. The fetch information of the data block fetched in a shared form is not registered.

Specifically, the controller 12 executes a process shown in FIG. 3(B) in the second embodiment. FIG. 3(B) is a registration processing flow of a directory cache executed by the controller of the second embodiment.

When there is a fetch of data to the cache memory 111 (step S5), the controller 12 checks whether or not the fetch is in an exclusive form (step S6). If the fetch is in an exclusive form (step S6 YES), the controller 12 stores the copy 131 of the directory information 151 related to the fetched data in the directory cache storage unit 13 (step S7). If the fetch is not in an exclusive form, in other words, if the fetch is a fetch in a shared form (step S6 NO), the controller 12 ends the process without executing step S7. As a result, the copy 131 of the directory information 151 related to the data fetched in a shared form is not stored in the directory cache storage unit 13.

As a result of the process, the controller 12 stores the information in the directory cache storage unit 13 by prioritizing the directory information 151 related to the data fetched in an exclusive form over the directory information 151 related to the data fetched in a shared form. In other words, the controller 12 always stores the copy 131 of the directory information 151 related to the data fetched in an exclusive form in the directory cache storage unit 13 and does not store the copy 131 of the directory information 151 related to the data fetched in a shared form in the directory cache storage unit 13.

As described, when only the fetch information with an exclusive right is always registered, the search and hit of the memory address d in the directory cache storage unit 13 denotes that the data block is fetched with an exclusive right to the cache memory 111 that includes the memory address d. The fact that the memory address d does not hit denotes that the data is not fetched or the data that is fetched without an exclusive right and that is in the memory 14 is the latest. Therefore, if there is no hit in the directory cache storage unit 13 when the request for the memory address d is a sharing request, the data in the memory 14 can be used.

In the embodiment, a write-back process to the memory 14 is necessary to evict the fetch information of the data block fetched in an exclusive form from the directory cache storage unit 13. As a result of the write-back process to the memory 14, the data block fetched in an exclusive form that will be evicted or that is evicted is written back to the memory 14.

If the fetch information of the data block fetched in an exclusive form from the directory cache storage unit 13 overflows, the replacement process is not executed, and the data block corresponding to the entry as a target of the replacement process is written back to the memory 14.

For example, it is assumed that the copy 131 of the directory information 151 needs to be newly registered in the directory cache storage unit 13 of the node 1A. As a result of reading out the copy 131 of the directory information 151 of the entry as a target of the replacement process, the controller 12 of the node 1A recognizes that the cache memory of the node 1B owns the data block to be processed. In this case, the controller 12 of the node 1A requests the node 1B to write the data block to be processed back to the memory. The node 1B that has received the request discards the data block to be processed existing in the cache memory 111 of the node 1B. If the data block to be processed is updated, i.e. dirty, the data block to be processed is transferred to the node 1A to write the data block back to the memory 14. If the data block to be processed is not updated, the write-back to the memory 14 is not necessary, and the data block is simply invalidated in the cache memory of the node 1B.

Third Embodiment

In this embodiment, the directory storage unit 15 is provided in addition to the directory cache storage unit 13, and the following protocol is set in relation to the registration of the fetch information of the data block to the directory cache storage unit 13. More specifically, the fetch information of the data block fetched in an exclusive form is basically registered, but is allowed to overflow from the directory cache storage unit 13. The fetch information of the data block fetched in a shared form is not registered. Therefore, the overflowed fetch information of the data block fetched in an exclusive form is registered only in the directory storage unit 15.

Specifically, the controller 12 always stores the copy 131 of the directory information 151 related to the data fetched in an exclusive form in the directory cache storage unit 13 and stores the copy 131 of the directory information 151 related to the data fetched in a shared form if there is a space in the directory cache storage unit 13.

Fourth Embodiment

In this embodiment, the directory storage unit 15 is provided in addition to the directory cache storage unit 13, and the following protocol is set in relation to the registration of the fetch information of the data block to the directory cache storage unit 13. More specifically, the fetch information of the data block fetched in an exclusive form is always registered. The fetch information of the data block fetched in a shared form is registered if there is a space in the directory cache storage unit 13.

Specifically, the controller 12 allows the copy 131 of the directory information 151 related to the data fetched in an exclusive form to overflow from the directory cache storage unit 13 to store the copy 131 in the directory cache storage unit 13 and does not store the copy 131 of the directory information 151 related to the data fetched in a shared form in the directory cache storage unit 13.

In the embodiment, the write-back process to the memory 14 is necessary to evict the fetch information of the data block fetched in an exclusive form from the directory cache storage unit 13 as in the second embodiment. As a result of the write-back process to the memory 14, the fetch information of the data block fetched in an exclusive form that will be evicted or that is evicted is written back to the memory 14.

Fifth Embodiment

In the foregoing embodiments, the computer system maintains the cache coherence in accordance with one predetermined cache protocol. However, the cache protocol may be selectable in accordance with, for example, the state or the scale of the computer system.

Figure 13:
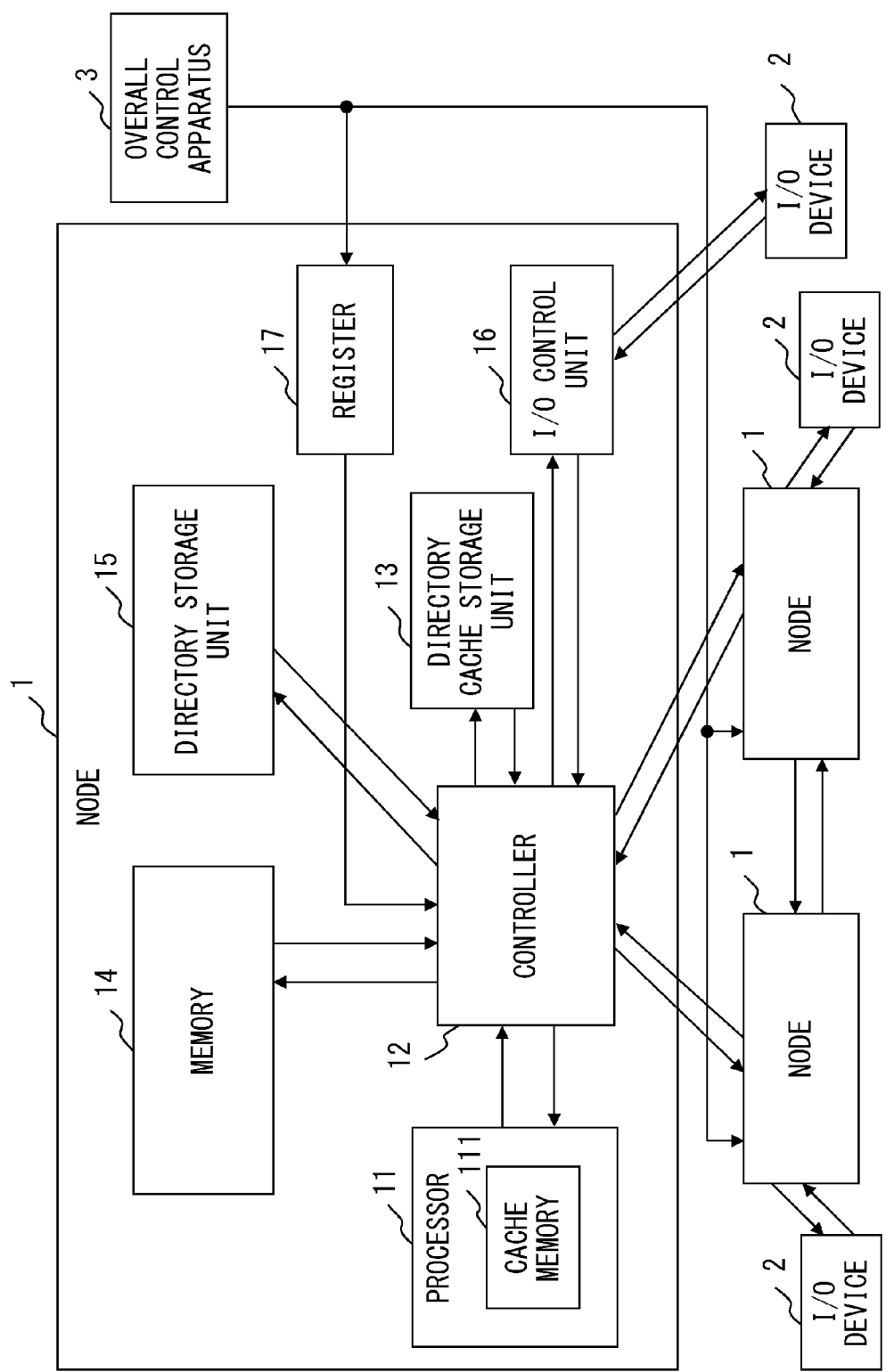
FIG. 13 is a diagram illustrating another configuration of the computer system.

FIG. 13 is a diagram showing another configuration of the computer system according to an embodiment of the present invention. The computer system of FIG. 13 further includes an overall control apparatus 3 as well as a register 17 for each node 1 in addition to the configuration included in the computer system of FIG. 1.

The overall control apparatus 3 is a computer that controls the computer system and is connected to each node 1 without involvement of a network. The overall control apparatus 3 inputs control information for controlling the directory cache storage unit 13 in the register 17 of each node 1. The register 17 stores the inputted control information. The register 17 sets the cache protocol in the controller 12 based on the inputted control information. In this way, the controller 12 changes the level of priority of storing, in the directory cache storage unit 13, the copy 131 of the directory information 151 related to the data fetched in an exclusive form and the copy 131 of the directory information 151 related to the data fetched in a shared form in accordance with the control information stored in the register 17.

Therefore, the most efficient control can be selected from the cache protocols shown in the first to fourth embodiments to select the most efficient control protocol. For example, the most efficient control protocol can be flexibly selected in accordance with the state or the scale of the computer system.

In this way, all fetch information is included in the directory storage unit 15, and the directory of data block fetched in an exclusive form is basically registered in the directory cache storage unit 13. Therefore, the copy 131 of the directory information 151 can be efficiently included. As a result, the frequency of eviction can be reduced, and an increase in the communication traffic between the processors can be prevented to speed up the process.

Sixth Embodiment

In the foregoing embodiments, when data is fetched to another cache memory 111, the directory storage unit 15 includes at least information indicating in which state the data is fetched. The state of the fetch is, for example, a shared type or an exclusive type.

However, for example, a shared-type fetch request of a data block that is first fetched in an exclusive form may be generated in the middle of the process, and the data may exist in a plurality of cache memories 111.

Therefore, in this embodiment, the controller 12 may update the state information in the directory storage unit 15 and the directory cache storage unit 13 or may maintain the original state information.

Seventh Embodiment

In the foregoing embodiments, the copy 131 of the directory information 151 always exists in the directory cache storage unit 13 in the case of an exclusive type as described above. Therefore, the directory information 151 indicates fetching of data in a shared form if "the copy 131 of the directory information 151 does not exist in the directory cache storage unit 13" and "the directory information 151 indicates that the data is fetched".

Therefore, in this embodiment, the controller 12 may not distinguish the fetch information in a shared form and the fetch information in an exclusive form in the directory storage unit 15.

Eighth Embodiment

In the foregoing embodiments, although the computer system adopting the directory system has been described, the present invention can be applied to a system (hereinafter, hybrid system) with a combination of the directory system and the snoop system.

Figure 14:
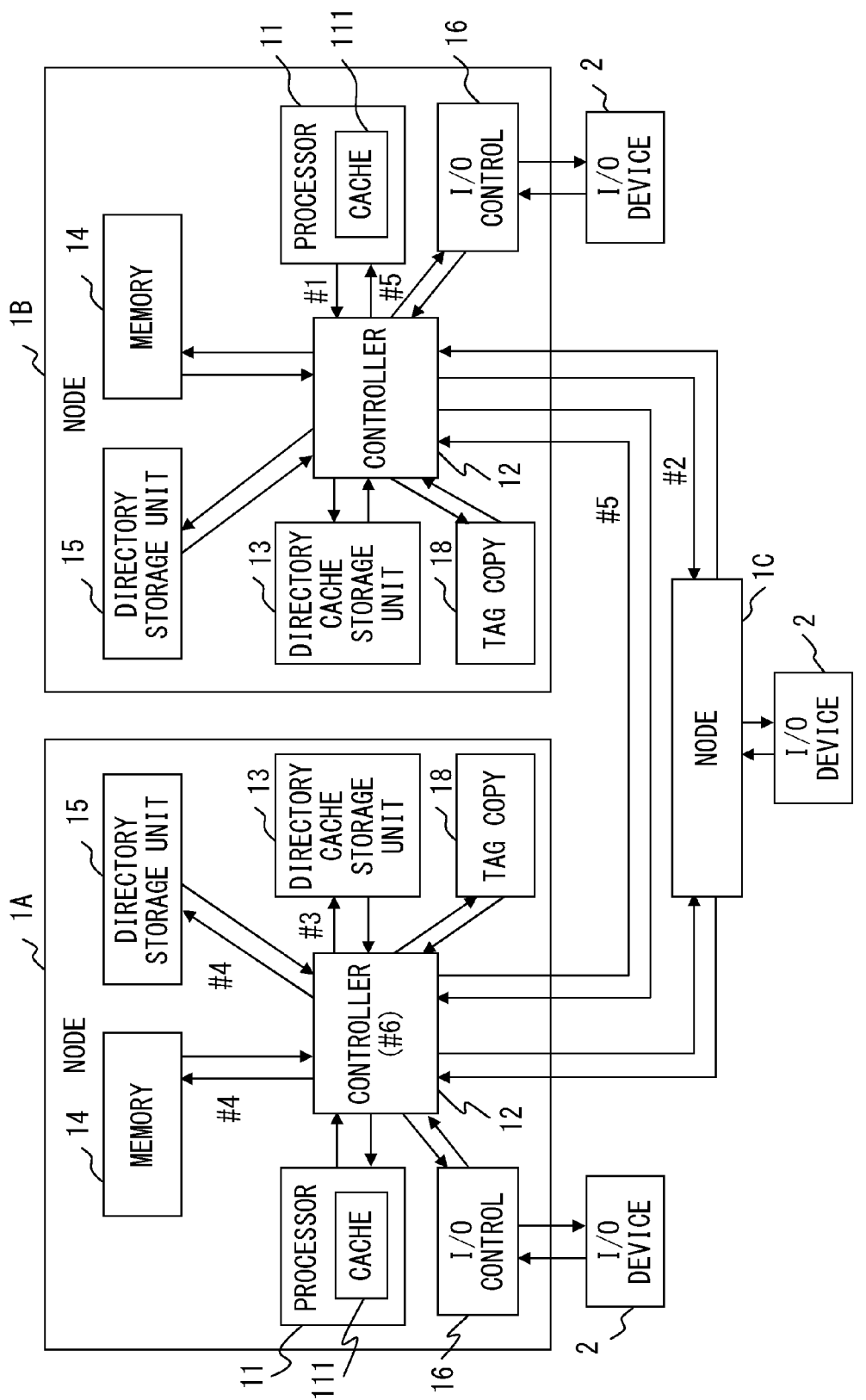
FIG. 14 is a diagram illustrating yet another configuration of the computer system.
Figure 15:
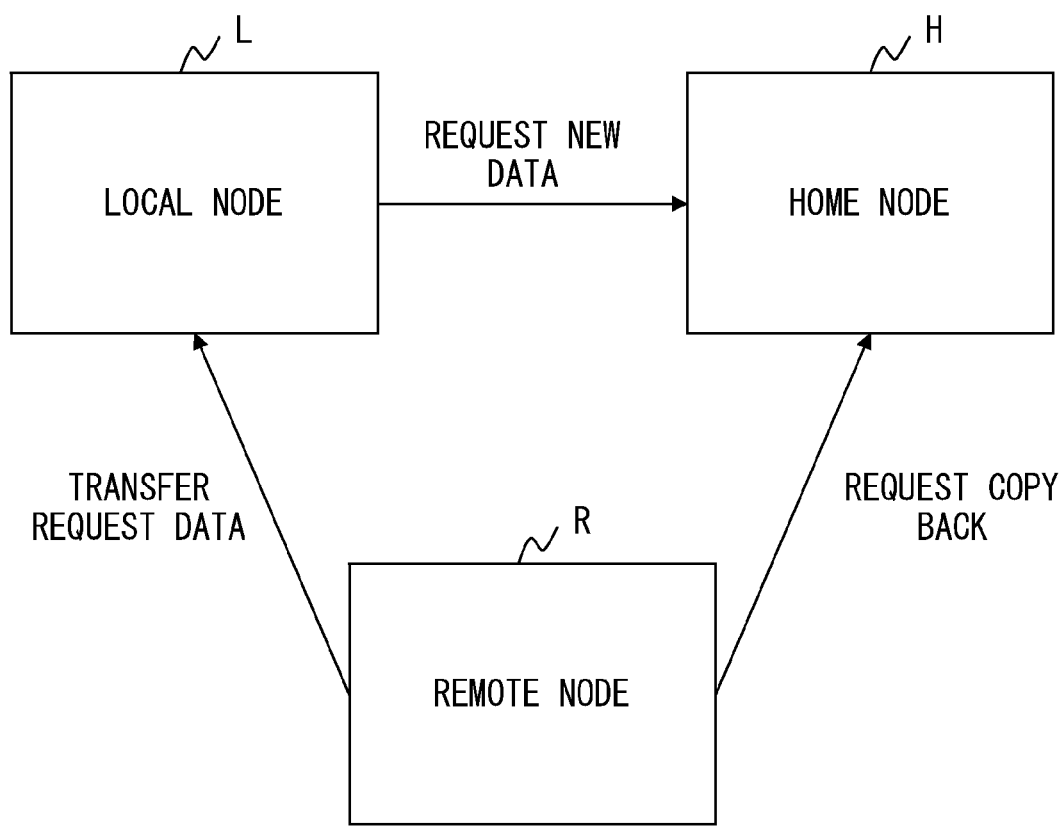
FIG. 15 is a diagram for explaining processing time according to an acquisition path of data.

FIG. 14 is a diagram showing yet another configuration of the computer system according to an embodiment of the present invention. The computer system of FIG. 14 further includes a tag copy 18 in each node 1 in addition to the configuration included in the computer system of FIG. 1.

In the snoop system, an interconnect that connects the processors holds therein the copy (tag copy) 18 of the cache tag of each cache memory. The tag copies 18 correspond one-to-one with the cache tags. This is a state in which state information of one data block is dispersed and managed. Therefore, in the snoop system, the tag copies 18, in which all cache tags are copied, are held to recognize the states of the data blocks. Thus, the cache system becomes huge, and the load of the network tends to be large in proportion to the number of cache memories.

Meanwhile, in the hybrid system, a cache including the cache copy can be identified in the directory by snooping. Therefore, the information indicating which cache memory has fetched the data does not have to be held.

In the present invention, the directory cache storage unit is included in the hybrid system as shown in FIG. 14, and only the fact that the data is fetched to another cache memory 111 in an exclusive form is registered in the directory cache storage unit 13 as described above. This can reduce the size of the directory cache storage unit 13.

In this case, the controller 12 references the tag copy 18 to snoop the cache tag when there is a hit in the directory cache storage unit 13. As a result of the snoop, the cache memory 111 that has fetched the data can be specified. Therefore, processes, such as acquisition and invalidation of update information, can be executed. As a result, the positional information indicating which cache memory 111 has fetched the data does not have to be stored in the directory cache storage unit 13. This can reduce the size of the directory cache storage unit 13.

In addition, the controller 12 may register the copy 131 of the directory information 151 in the directory cache storage unit 13 only when the data of the memory 14 is fetched to the cache memory 111 of a processor other than the home node. In this case, the directory information 151 is used only when the request source node and the home node coincide. More specifically, if a request address outputted from the processor of the local node indicates the address of the local node, the directory cache storage unit 13 is referenced, and if not, snooping is immediately performed. If there is no hit as a result of referencing the directory cache, the memory of the local node is read out. If there is a hit, it indicates that the data is fetched to another cache. Therefore, snooping is immediately performed to specify the fetch location.

As a result, information indicating that the cache memory 111 of the home node, i.e. its own cache memory 111, is fetching the data, can be made unnecessary. In other words, there is already a hit in the directory cache storage unit 13 in this case, and the directory storage unit 15 is not searched. If there is no hit in the directory cache storage unit 13, the latest data can be acquired from the memory 14. If the request source node and the home node do not coincide, the cache memory 111 is immediately snooped. Therefore, it is possible for the copy 131 of the directory information 151 to include only information indicating that the data is copied to the cache memory 111. As a result, the size of the directory cache storage unit 13 can be reduced.

Meanwhile, if the request from the processor is a sharing request of the data, the latest data is acquired from the memory 14 to complete the process.

If the request from the processor is for acquisition of an exclusive right of the data, the process of invalidation needs to be executed in all cache memories 111 possessing the requested data. Therefore, all cache memories 111 that are fetching the data need to be specified to execute the process. Specifically, the controller 12 references the directory storage unit 15 that includes and registers even the shared-type fetch information to check the presence of the shared-type fetch information and further snoops the cache tag to execute the process of invalidation if the data is fetched in a shared form.

Ninth Embodiment

In the foregoing embodiments, the data block is read out from the cache memory 111 if the data block is in the cache memory 111. However, if the data block to be processed is the same as the data block in the memory 14, i.e. if the data block is clean, the data block may be read out from the memory 14. In other words, the data block may be read out from any one of the memory 14 and the cache memory 111.

For example, when the copy 131 of the directory information 151 of the data block fetched in a shared form is stored in the directory cache storage unit 13, the controller 12 recognizes that the data block is fetched in a shared form as a result of the search by the directory cache storage unit 13. In this case, it may be more efficient to read out the data block from the cache memory 111 than from the memory 14. In this case, the data block may be read out from the cache memory 111 instead of the memory 14 even if the data block is fetched in a shared form.

Tenth Embodiment

Although the computer system adopting the MESI as a cache protocol has been described in the foregoing embodiments, the present invention can also be applied to a computer system adopting a cache protocol other than the MESI.

Examples of the cache protocol other than the MESI include MSI including three states of M, S, and I and MOESI with an addition of Owned (O) to the MSI. The MOESI is a cache protocol as described below. If there is a further sharing request to a rewritten data block (state M), the state M changes to the state O. The state O is a state in which there is an obligation to write back the data block to be processed to the memory. In the processor that has acquired the data block to be processed by issuing the sharing request, the state of the data block to be processed is the state S.

In such cache protocols, the controller 12 manages the state M as exclusive-type data and manages the other states S and I, or the states S, I, and O, as shared-type data. The controller 12 sets the priority of storage of the copy 131 of the directory information 151 related to the data fetched in an exclusive form in the directory cache storage unit 13 higher than the priority of storage of the copy 131 of the directory information 151 related to the data fetched in a shared form in the directory cache storage unit 13. The controller 12 stores, in the directory cache storage unit 13, at least the copy 131 of the directory information 151 related to the data fetched in an exclusive form.

What is claimed is:

1. A computer system, comprising:
    a memory that stores data;
    a cache memory that stores a copy of the data;
    a directory storage unit that stores directory information related to the data, and includes information indicating that the data is copied to the cache memory;
    a directory cache storage unit that stores a copy of the directory information stored in the directory storage unit; and
    a control unit that controls storage of data in the directory cache storage unit, manages the data copied from the memory to the cache memory by dividing the data into an exclusive form and a shared form, and stores the directory information in the directory cache storage unit by prioritizing the directory information related to the data fetched in the exclusive form over the directory information related to the data fetched in the shared form and stores the directory information related to the data fetched in the shared form when there is a space in the directory cache storage unit.

2. The computer system according to claim 1, wherein the control unit always stores the directory information related to the data fetched in the exclusive form in the directory cache storage unit and does not store the directory information related to the data fetched in the shared form in the directory cache storage unit.

3. The computer system according to claim 1,
    further comprising a register that stores control information for controlling the directory cache storage unit,
    wherein the control unit changes levels of the priorities of storage of the directory information related to the data fetched in the exclusive form and the directory information related to the data fetched in the shared form in the directory cache storage unit in accordance with the control information stored in the register.

4. The computer system according to claim 1, wherein the directory information includes only information indicating that the data is copied to the cache memory.

5. A computer system, comprising:
a memory that stores data;
a cache memory that stores a copy of the data;
a directory storage unit that stores directory information related to the data, and includes information indicating that the data is copied to the cache memory;
a directory cache storage unit that stores a copy of the directory information stored in the directory storage unit; and
a control unit that controls storage of data in the directory cache storage unit, manages the data copied from the memory to the cache memory by dividing the data into an exclusive form and a shared form, and always stores the directory information related to the data fetched in the exclusive form in the directory cache storage unit and stores the directory information related to the data fetched in the shared form when there is a space in the directory cache storage unit.

6. A computer system, comprising:
a memory that stores data;
a cache memory that stores a copy of the data;
a directory storage unit that stores directory information related to the data, and includes information indicating that the data is copied to the cache memory;
a directory cache storage unit that stores a copy of the directory information stored in the directory storage unit; and
a control unit that controls storage of data in the directory cache storage unit, manages the data copied from the memory to the cache memory by dividing the data into an exclusive form and a shared form, and allows the directory information related to the data fetched in the exclusive form to overflow from the directory cache storage unit to store the directory information in the directory cache storage unit and does not store the directory information related to the data fetched in the shared form in the directory cache storage unit.

7. A computer system comprising:
a memory that stores data;
a cache memory that stores a copy of the data;
a directory storage unit that stores directory information related to the data, and includes information indicating that the data is copied to the cache memory;
a directory cache storage unit that stores a copy of the directory information stored in the directory storage unit;
a tag copy that stores cache tags that are tags of all data copied to the cache memory; and
a control unit that controls storage of data in the directory cache storage unit, manages the data copied from the memory to the cache memory by dividing the data into an exclusive form and a shared form, stores the directory information in the directory cache storage unit by prioritizing the directory information related to the data fetched in the exclusive form over the directory information related to the data fetched in the shared form and stores the directory information related to the data fetched in the shared form when there is space in the directory cache storage unit, and snoops the cache tags stored in the tag copy when the directory cache storage unit is hit to specify the cache memory that has fetched the data corresponding to the hit directory information.

8. A control method of a computer system including a memory storing data, a cache memory storing a copy of the data, a directory storage unit storing directory information related to the data, the directory information including information indicating that the data is copied to the cache memory, a directory cache storage unit storing a copy of the directory information stored in the directory storage unit, the control method comprising:
managing the data copied from the memory to the cache memory by dividing the data into an exclusive form and a shared form; and
storing the directory information in the directory cache storage unit by prioritizing the directory information related to the data fetched in the exclusive form over the directory information related to the data fetched in the shared form and storing the directory information related to the data fetched in the shared form when there is space in the directory cache storage unit.

9. A non-transitory computer-readable medium storing a program for directing a computer including a memory storing data, a cache memory storing a copy of the data, a directory storage unit storing directory information related to the data, the directory information including information indicating that the data is copied to the cache memory, a directory cache storage unit storing a copy of the directory information stored in the directory storage unit to perform a process, the process comprising:
managing the data copied from the memory to the cache memory by dividing the data into an exclusive form and a shared form; and
storing the directory information in the directory cache storage unit by prioritizing the directory information related to the data fetched in the exclusive form over the directory information related to the data fetched in the shared form and storing the directory information related to the data fetched in the shared form when there is space in the directory cache storage unit.

* * * * *